United States Patent
Burns et al.

(10) Patent No.: US 12,466,807 B2
(45) Date of Patent: Nov. 11, 2025

(54) SALT AND CRYSTAL FORM OF A FAK INHIBITOR

(71) Applicant: Amplia Therapeutics Limited, Melbourne (AU)

(72) Inventors: Christopher Burns, Melbourne (AU); John Lambert, Melbourne (AU)

(73) Assignee: Amplia Therapeutics Limited, Melbourne (AU)

(*) Notice: Subject to any disclaimer, the term of this patent is extended or adjusted under 35 U.S.C. 154(b) by 981 days.

(21) Appl. No.: 17/598,187

(22) PCT Filed: Mar. 27, 2020

(86) PCT No.: PCT/AU2020/050292
§ 371 (c)(1),
(2) Date: Sep. 24, 2021

(87) PCT Pub. No.: WO2020/191448
PCT Pub. Date: Oct. 1, 2020

(65) Prior Publication Data
US 2022/0340540 A1    Oct. 27, 2022

(30) Foreign Application Priority Data
Mar. 28, 2019 (AU) .............................. 2019901050

(51) Int. Cl.
C07D 401/12 (2006.01)
A61K 9/00 (2006.01)

(52) U.S. Cl.
CPC .......... *C07D 401/12* (2013.01); *A61K 9/0053* (2013.01); *C07B 2200/13* (2013.01)

(58) Field of Classification Search
CPC .. C07D 401/12; A61K 9/0053; C07B 2200/13
See application file for complete search history.

(56) References Cited

U.S. PATENT DOCUMENTS

| | | | |
|---|---|---|---|
| 8,377,938 B2 | 2/2013 | Matsushima | |
| 9,174,946 B2 * | 11/2015 | Holmes | ................... A61P 35/00 |
| 2023/0190746 A1 | 6/2023 | Burns | |

FOREIGN PATENT DOCUMENTS

| | | |
|---|---|---|
| JP | 2015520243 A | 7/2015 |
| WO | 199722596 A1 | 6/1997 |
| WO | 199730035 A1 | 8/1997 |
| WO | 199732856 A1 | 9/1997 |
| WO | 199813354 A1 | 4/1998 |
| WO | 199835985 A1 | 8/1998 |
| WO | 199902166 A1 | 1/1999 |
| WO | 200040529 A1 | 7/2000 |
| WO | 200041669 A2 | 7/2000 |
| WO | 200047212 A1 | 8/2000 |
| WO | 200132651 A1 | 5/2001 |
| WO | 200160814 A2 | 8/2001 |
| WO | 200192224 A1 | 12/2001 |
| WO | 200204434 A1 | 1/2002 |
| WO | 200208213 A1 | 1/2002 |
| WO | 2008023698 A1 | 2/2008 |
| WO | 2012110774 A1 | 8/2012 |
| WO | 2013192556 A2 | 12/2013 |
| WO | 2014027199 A1 | 2/2014 |
| WO | 2020019448 A1 | 1/2020 |
| WO | 2021237273 A1 | 12/2021 |

OTHER PUBLICATIONS

PubChem CAS RN 1393653-34-3. (Year: 2012).*
Amplia Therapeutics (May 19, 2020). "FDA Awards Amplia Orphan Drug Designation for Idiopathic Pulmonary Fibrosis," ASX Release, 2 pages.
Carvalho, J. (May 20, 2020). "FDA Names AMP945, Potential IPF Treatment, an Orphan Drug," located at https://pulmonaryfibrosisnews.com/news/fda-names-amp945-potential-idiopathic-pf-treatment-orphan-drug/?cn-reloaded=1, last visited on Jun. 17, 2024, six pages.
Lagares, D. et al. (May 2012). "Inhibition of Focal Adhesion KinasePrevents Experimental Lung Fibrosis and Myofibroblast Formation," Arthritis & Rheumatism 64(5):1653-1664.
Bastin, R. J. et al, (2000). "Salt Selection and Optimization Procedures for Pharmaceutical New Chemical Entities," Organic Process Research & Development 4(5):427-435.
Hirayama, N. (2008). Yukikagobutsu Kessho Sakusei Handobukku (handbook for preparation of organic compound crystals), pp. 17-23, 37-40, 45-51, 57-65. 35 pages.
Wermuth, C.G. (1999). The Practice of Medicinal Chemistry, second volume, p. 347-365, Technomics, Inc., total pages 27.

(Continued)

*Primary Examiner* — Clinton A Brooks
*Assistant Examiner* — Josmalen M. Ramos-Lewis
(74) *Attorney, Agent, or Firm* — MORRISON & FOERSTER LLP

(57) ABSTRACT

The present invention is directed to the tartrate salt of a FAK inhibitor defined by formula (I) below, and the use of that inhibitor for treating a proliferative disease.

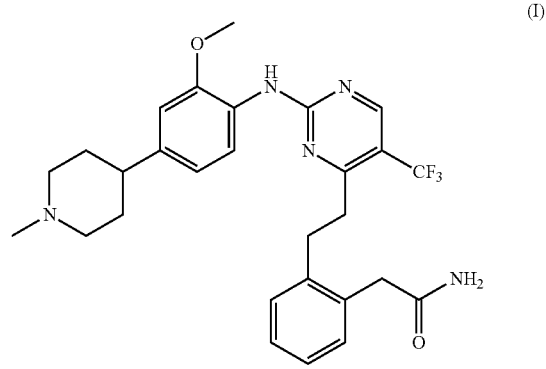

(I)

9 Claims, 20 Drawing Sheets

(56) References Cited

OTHER PUBLICATIONS

Balbach, S. et al. (2004). "Pharmaceutical Evaluation Of Early Development Candidates "The 100 Mg-Approach"," International Journal of Pharmaceutics 275(1-2):1-12, 20 pages.
Golas, J.M. et al. (Jan. 15, 2003). "SKI-606, A 4-Anilino-3-Quinolinecarbonitrile Dual Inhibitor Of Src And Abl Kinases, Is A Potent Antiproliferative Agent Against Chronic Myelogenous Leukemia Cells In Culture And Causes Regression Of K562 Xenografts In Nude Mice," Cancer Research 63(2):375-381.
International Search Report and Written Opinion of the Searching Authority mailed on May 4, 2020, filed on Mar. 27, 2020 for Patent Application No. PCT/AU2020/050292, 11 pages.
Flaherty, K.R. et al. (2021). "Nintedanib In Progressive Fibrosing Interstitial Lung Diseases," Eur. Respir., 1718-1727, 27 pages.
Crestani, B. et al. (2019, e-pub. Sep. 14, 2018). "Long-Term Safety And Tolerability Of Nintedanib In Patients With Idiopathic Pulmonary Fibrosis: Results From The Open-Label Extension Study, INPULSIS-ON," The Lancet Respiratory Medicine 7(1):60-68.
Evans, C. M. et al. (2016). "Idiopathic Pulmonary Fibrosis: A Genetic Disease That Involves Mucociliary Dysfunction Of The Peripheral Airways," Physiological Reviews 96(4):1567-1591, 27 pages.
George, P. M. et al. (Aug. 2020, e-pub. May 15, 2020). "Pulmonary Fibrosis And COVID-19: The Potential Role For Antifibrotic Therapy," The Lancet Respiratory Medicine 8(8):807-815.
International Search Report and Written Opinion mailed Jun. 11, 2021, for PCT Patent Application No. PCT/AU2021/050457, filed May 12, 2021, 11 pages.
Kato, M. et al. (2019, e-pub. Aug. 19, 2019). "Gastrointestinal Adverse Effects Of Nintedanib And The Associated Risk Factors In Patients With Idiopathic Pulmonary Fibrosis," Scientific Reports 9(1):1-9.
King Jr., T. E. et al. (May 29, 2014). "A Phase 3 Trial Of Pirfenidone In Patients With Idiopathic Pulmonary Fibrosis," New England Journal Of Medicine 370(22):2083-2092.
Kinoshita, K. et al. (May 3, 2013). "Antifibrotic Effects of Focal Adhesion Kinase Inhibitor in Bleomycin-Induced Pulmonary Fibrosis in Mice," American Journal Of Respiratory Cell And Molecular Biology 49(4):536-543.
Kärkkäinen, M. et al. (Aug. 22, 2017). "Effect Of Smoking And Comorbidities On Survival in Idiopathic Pulmonary Fibrosis," Respiratory Research 18(160):1-10.
Lagares, D. et al. (2013, e-pub. Nov. 27, 2012). "Targeting Focal Adhesion Kinase In Fibrotic Diseases," Biodrugs 27(1):15-23.
Lancaster, L. et al. (2019). "Safety And Survival Data In Patients With Idiopathic Pulmonary Fibrosis Treated With Nintedanib: Pooled Data From Six Clinical Trials," BMJ Open Respiratory Research 6(1):e000397. 7 pages.
Lancaster, L. H. et al. (2017). "Pirfenidone Safety And Adverse Event Management In Idiopathic Pulmonary Fibrosis," European Respiratory Review 26(146):10 Pages.
Maher, T. M. et al. (2019). "Antifibrotic Therapy For Idiopathic Pulmonary Fibrosis: Time To Treat," Respiratory Research 20(205):1-9.
Martinez, F. J. et al. (2017, e-pub, Oct. 20, 2017). "Idiopathic Pulmonary Fibrosis," Nature Reviews Disease Primers 3(17074):1-19.
Mercer, P. F. et al. (2013, e-pub. Jan. 5, 2013). "Coagulation And Coagulation Signalling In Fibrosis," Biochimica Et Biophysica Acta (BBA)-Molecular Basis of Disease 1832(7):1018-1027.
Raghu, G. et al. (Jul. 2014, e-pub. May 27, 2014). "Idiopathic Pulmonary Fibrosis In US Medicare Beneficiaries Aged 65 Years And Older: Incidence, Prevalence, And Survival, Nov. 2001," The Lancet Respiratory Medicine 2(7):566-572, 10 pages.
Richeldi, L. et al. (2020). "Efficacy And Safety Of Nintedanib In Idiopathic Pulmonary Fibrosis," New England Journal Of Medicine 20:3, 8 pages.
Roberts, W. G. et al. (Mar. 15, 2008). "Antitumor Activity And Pharmacology Of A Selective Focal Adhesion Kinase Inhibitor, PF-562,271," Cancer Research 68(6):1935-1944.
Russell, A. M. et al. (Oct. 15, 2016). "Daily Home Spirometry: An Effective Tool For Detecting Progression In Idiopathic Pulmonary Fibrosis," American Journal Of Respiratory And Critical Care Medicine 194(8):989-997.
Taskar, V.S. et al. (2006). "Is Idiopathic Pulmonary Fibrosis An Environmental Disease?," Proceedings Of The American Thoracic Society 3(4):293-298.
Van Manen, M. J. et al. (2017). "Optimizing Quality Of Life In Patients With Idiopathic Pulmonary Fibrosis," Therapeutic Advances in Respiratory Disease 11(3):157-169.
Visca, D. et al. (2018). "Effect Of Ambulatory Oxygen On Quality Of Life For Patients With Fibrotic Lung Disease (Ambox): A Prospective, Open-Label, Mixed-Method, Crossover Randomised Controlled Trial," The Lancet Respiratory! Medicine 6(10):759-770, 33 pages.
Wang, Z. G. et al. (2008). "TAE226, A Dual Inhibitor For FAK And IGF-IR, Has Inhibitory Effects On Mtor Signaling In Esophageal Cancer Cells," Oncology Reports 20(6):1473-1477.
Zhao, X. K. et al. (Jan. 14, 2016), "Focal Adhesion Kinase Regulates Fibroblast Migration Via Integrin Beta-1 And Plays A Central Role In Fibrosis," Scientific Reports 6(19276):1-12.
Lombardo, L.J. et al. (Dec. 1, 2004). "Discovery Of N-(2-Chloro-6-Methyl-Phenyl)-2-(6-(4-(2-Hydroxyethyl)-Piperazin-1-Yl)-2-Methylpyrimidin-4-Ylamino) Thiazole-5-Carboxamide (BMS-354825), A Dual Src/Abl Kinase Inhibitor With Potent Antitumor Activity In Preclinical Assays," Journal Of Medicinal Chemistry 47(27):6658-6661.
Stern, M. et al. (Apr. 1, 2005). "Overview Of Monoclonal Antibodies In Cancer Therapy: Present And Promise," Critical Reviews In Oncology/Hematology 54(1):11-29.

* cited by examiner

SALT AND CRYSTAL FORM OF A FAK INHIBITOR

CROSS REFERENCE TO RELATED APPLICATIONS

This application is a national stage application under 35 U.S.C. § 371 of International Application No. PCT/AU2020/050292, filed internationally on Mar. 27 2020, which claims priority to Australian Application No. 2019901050, filed on Mar. 28, 2019.

FIELD OF THE INVENTION

The present invention is directed to the tartrate salt of a FAK inhibitor defined by formula I below

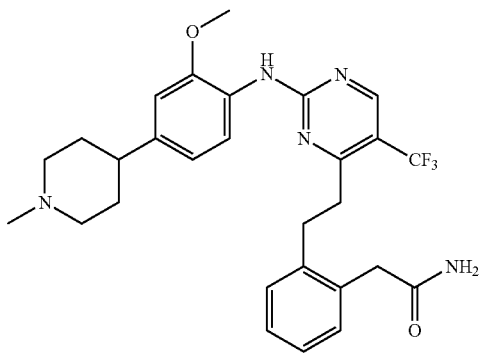

Formula I

BACKGROUND OF THE INVENTION

WO2012110774 discloses a class of 2,4,5-substituted pyrimidines showing activity against Focal Adhesion Kinase (FAK) also known as protein tyrosine kinase 2 (PTK2) and to pharmaceutical compositions containing said compounds.

Directional cell migration is important in many physiological and pathological processes including embryonic development, wound healing, angiogenesis, tumour invasion and metastasis. Transduction of extracellular signals, that stimulate cells to move directionally, may be induced by a number of processes including transmembrane integrins binding to extra cellular matrix proteins and the action of growth factors (for example EGF, IGF and VEGF) on the extracellular domains of their cognate receptors.

FAK is a non-receptor tyrosine kinase that mediates signals from both transmembrane integrins and growth factor receptors. FAK has been reported to play a central role in coordinating these diverse extra cellular signals, integrating them in a fashion that results in directional movement of cells through their external environment.

Integrin clustering or the activation of a growth factor receptor (for example EGFR, IGF-1 R, Her2 and VEGFR) promotes FAK autophosphorylation at Y397.

Phosphorylated Y397 FAK then binds to c-Src (referred to as Src herein) and Src mediated phosphorylation of FAK at Y576 and Y577 occurs to give rise to an active FAK-Src complex. Active FAK-Src then facilitates signaling via a number of biochemical pathways which influence processes such as cell adhesion, migration, invasion, cell survival, proliferation, acquisition of chemotherapy resistance and metastasis.

Therefore a FAK inhibitor would have application for the reduction of cell adhesion, cell migration, cell invasion, cell proliferation and chemo-resistance. Furthermore, a FAK inhibitor would have applicability to induce apoptosis for cells in inappropriate extra cellular matrix environments and reduce angiogenesis.

A compound which is a selective FAK inhibitor would enable the targeting of specific biological pathways, without any potential issues caused by the inhibition of any targets, such as other protein kinases.

The present inventors have found that the compound of formula I (which is the third example of the thirteen examples presented in WO2012110774) shows potential as a druggable molecule.

SUMMARY OF THE INVENTION

The present inventors have found that the tartrate salt of the compound of formula I has properties that provide additional advantages over the free base in relation to storage and biopharmaceutical properties, including pharmacokinetics.

In particular:

Experimental evidence indicates that the crystalline form of the free base is a hydrate whereas the tartrate is anhydrous. The anhydrous nature of the tartrate salt means that it would be unable to dehydrate on storage and should therefore be more chemically and physically stable.

The tartrate salt is less hygroscopic than the free base crystalline form, meaning that on storage it is less likely to absorb water. Further, the free base absorbs water and converts to an alternate crystalline form. It is preferable for pharmaceutical solids to remain as a single crystalline form. Under similar conditions, the tartrate salt does not absorb as much water and stays in a single crystalline form.

The solubility of the tartrate salt is higher in water than the free base and this solubility is more consistent across the pH range tested. This offers the potential for more robust biopharmaceutic properties In rat models, the plasma AUC for the tartrate salt is significantly higher than for the corresponding free base.

Accordingly, in a first embodiment, there is provided a tartrate salt of the compound of formula I:

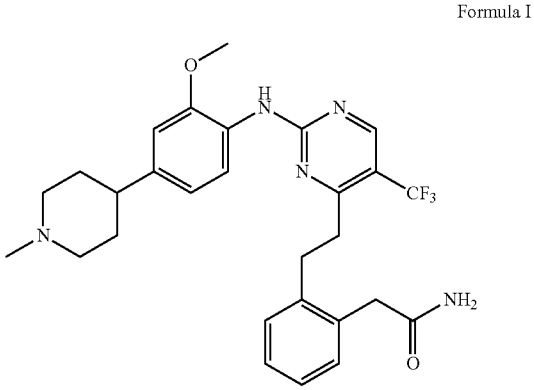 [SMILES: COc1cc(C2CCN(C)CC2)ccc1Nc1ncc(C(F)(F)F)c(CCc2ccccc2CC(N)=O)n1]

Formula I

Preferably, the tartrate salt is provided as a crystalline form.

In a second embodiment, there is provided a method of treating a proliferative disease using the tartrate salt of the first embodiment.

In a third embodiment, there is provided the tartrate salt of the first embodiment for use in treating a proliferative disease.

In a fourth embodiment, there is provided the use of the tartrate salt of the first embodiment in the preparation of a medicament for treating a proliferative disease.

In a fifth embodiment, there is provided a pharmaceutical composition comprising a tartrate salt of the first embodiment.

BRIEF DESCRIPTION OF THE DRAWINGS

FIGS. 3A and 3B 1H NMR Spectrum of Formula I L-tartrate Pattern 1 from Method 1.

FIGS. 14A and 14B 1H NMR Spectrum of Formula I L-tartrate Pattern 1 obtained from Method 2.

DETAILED DESCRIPTION OF THE EMBODIMENTS

Figure 1:
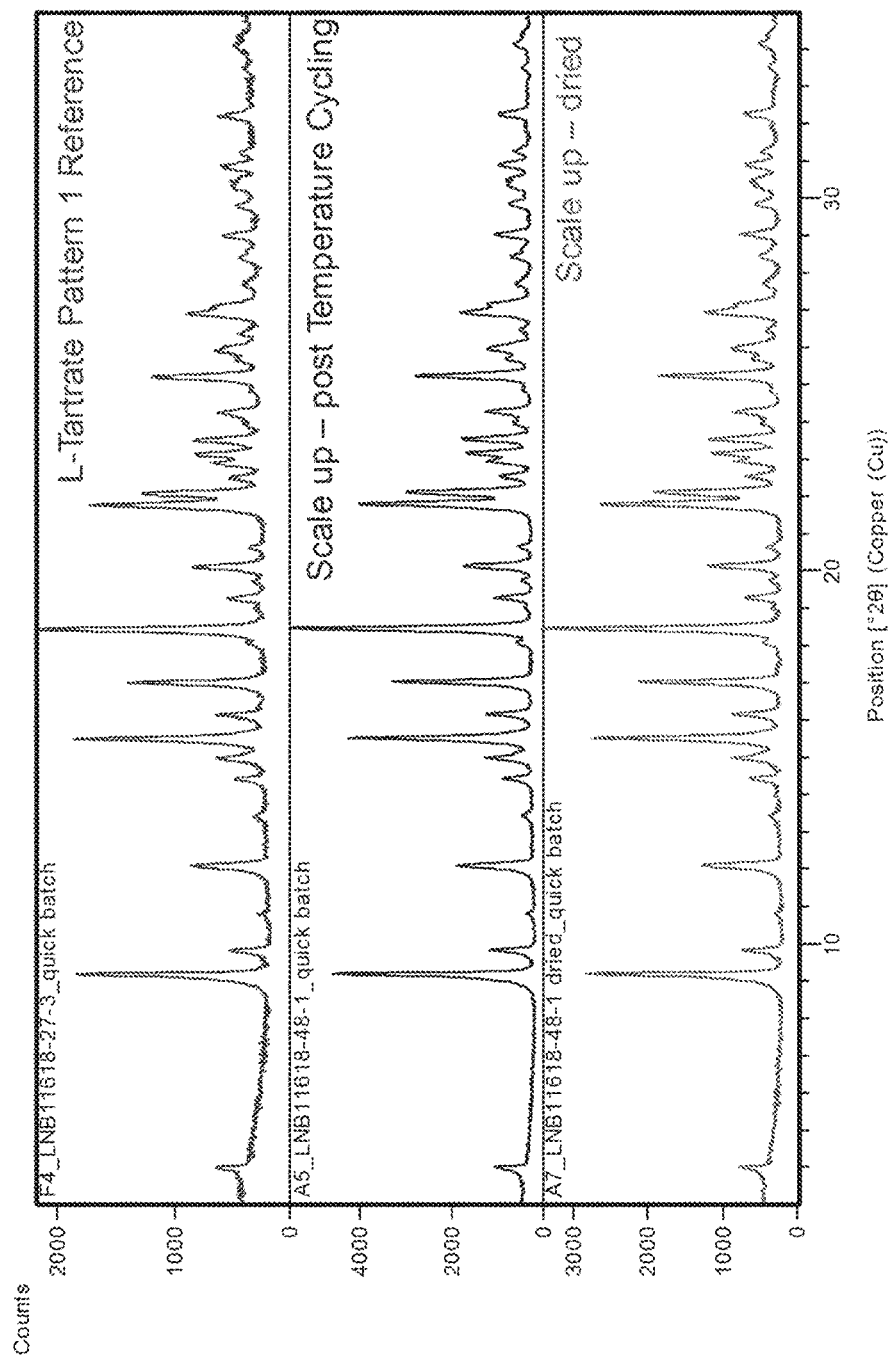
FIG. 1. XRPD Diffractograms of Solids Obtained from Formula I L-tartrate Pattern 1 method 1.

The present invention provides a tartrate salt of a compound of formula I:

Formula I

The tartrate salt may be D-tartrate or L-tartrate, preferably L-tartrate.

In a preferred embodiment, the present invention provides a crystalline form of the tartrate salt. In a further preferred form, the crystalline tartrate salt has a characteristic powder diffraction pattern (XRPD) with major peaks at 2 theta values at about 9.1, 15.5, 17.0, 18.5, 21.8, 22.1, and 25.3.

Preferably, the crystalline form of the tartrate salt has a solubility in water of between 0.8 mg/ml and 1.0 mg/ml, more preferably 0.9 mg/ml.

Preferably, the crystalline form of the tartrate salt has a melt onset of approximately between 172 degrees Celsius to 174 degrees Celsius, more preferably approximately 173 degrees Celsius.

In a preferred from the crystalline form of the tartrate salt has crystallinity of 80% or greater, 90% or greater, 95% or greater, 98% or greater, 99% or greater, and 99.5% or greater.

The invention further provides the tartrate salt of the present invention for use in a method of treatment of the human or animal body. Such a method may comprise administering to such a subject a therapeutically-effective amount of the tartrate salt, preferably in the form of a pharmaceutical composition.

The term "treatment", as used herein in the context of treating a condition, pertains generally to treatment and therapy, whether of a human or an animal (e.g. in veterinary applications), in which some desired therapeutic effect is achieved, for example, the inhibition of the progress of the condition, and includes a reduction in the rate of progress, a halt in the rate of progress, amelioration of the condition, and cure of the condition. Treatment as a prophylactic measure (i.e. prophylaxis) is also included.

The term "therapeutically-effective amount" as used herein, pertains to that amount of an active compound, or a material, composition or dosage form comprising the tartrate salt which is effective for producing some desired therapeutic effect, commensurate with a reasonable benefit/risk ratio.

Cancer

The tartrate salt of the present invention can be used as in the treatment of proliferative diseases, in particular as an anticancer agent. One of ordinary skill in the art is readily able to determine whether or not a candidate compound treats a cancerous condition for any particular cell type, either alone or in combination.

Examples of cancers include, but are not limited to, bone cancer, brain stem glioma, breast cancer, cancer of the adrenal gland, cancer of the anal region, cancer of the bladder, cancer of the endocrine system, cancer of the oesophagus, cancer of the head or neck, cancer of the kidney or ureter, cancer of the liver, cancer of the parathyroid gland, cancer of the penis, cancer of the small intestine, cancer of the thyroid gland, cancer of the urethra, carcinoma of the cervix, carcinoma of the endometrium, carcinoma of the fallopian tubes, carcinoma of the renal pelvis, carcinoma of the vagina, carcinoma of the vulva, chronic or acute leukemia, colon cancer, cutaneous or intraocular melanoma, haematological malignancies, Hodgkin's disease, lung cancer, lymphocytic lymphomas, neoplasms of the central nervous system (CNS), ovarian cancer, pancreatic cancer, pituitary adenoma, primary CNS lymphoma, prostate cancer, rectal cancer, renal cell carcinoma, sarcoma of soft tissue, skin cancer, spinal axis tumors, stomach cancer and uterine cancer.

Any type of cell may be treated, including but not limited to, lung, gastrointestinal (including, e.g., bowel, colon), breast (mammary), ovarian, prostate, liver (hepatic), kidney (renal), bladder, pancreas, brain, and skin.

The anti-cancer treatment defined hereinbefore may be applied as a sole therapy or may involve, in addition to the compound of the invention, conventional surgery or radiotherapy or chemotherapy. Such chemotherapy may include one or more of the following categories of anti-tumour agents:—(i) other antiproliferative/antineoplastic drugs and combinations thereof, as used in medical oncology, such as alkylating agents (for example cisplatin, oxaliplatin, carboplatin, cyclophosphamide, nitrogen mustard, melphalan, chlorambucil, busulphan, temozolamide and nitrosoureas); antimetabolites (for example gemcitabine and antifolates such as fluoropyrimidines like 5 fluorouracil and tegafur, raltitrexed, methotrexate, cytosine arabinoside, and hydroxyurea); antitumour antibiotics (for example anthracyclines like adriamycin, bleomycin, doxorubicin, daunomycin, epirubicin, idarubicin, mitomycin-C, dactinomycin and mithramycin); antimitotic agents (for example vinca alkaloids like vincristine, vinblastine, vindesine and vinorelbine and taxoids like taxol and docetaxel (Taxotere) and polokinase inhibitors); and topoisomerase inhibitors (for example epipodophyllotoxins like etoposide and teniposide, amsacrine, topotecan and camptothecin);

(ii) cytostatic agents such as antioestrogens (for example tamoxifen, fulvestrant, toremifene, raloxifene, droloxifene and iodoxyfene), antiandrogens (for example bicalutamide, flutamide, nilutamide and cyproterone acetate), LHRH antagonists or LHRH agonists (for example goserelin, leuprorelin and buserelin), progestogens (for example megestrol acetate), aromatase inhibitors (for example as anastrozole, letrozole, vorazole and exemestane) and inhibitors of 5*-reductase such as finasteride;

(iii) anti-invasion agents (for example c-Src kinase family inhibitors like 4-(6-chloro-2,3-methylenedioxyanilino)-7-[2-(4-methylpiperazin-1-yl)ethoxy]-5-tetrahydropyran-4-yloxyquinazoline (AZD0530; International Patent Application WO 01/94341), N-(2-chloro-6-methylphenyl)-2-{6-[4-(2-hydroxyethyl)piperazin-1-yl]-2-methylpyrimidin-4-ylamino}thiazole-5-carboxamide (dasatinib, BMS-354825; J. Med. Chem., 2004, 47, 6658-6661 and 4-((2,4-dichloro-5-methoxyphenyl)amino)-6-methoxy-7-(3-(4-methylpiperazin-1-yl)propoxy)quinoline-3-carbonitrile (bosutinib, SKI-606; Cancer research (2003), 63(2), 375-81), and metalloproteinase inhibitors like marimastat, inhibitors of urokinase plasminogen activator receptor function or antibodies to Heparanase);

(iv) inhibitors of growth factor function: for example such inhibitors include growth factor antibodies and growth factor receptor antibodies (for example the anti erbB2 antibody trastuzumab [HerceptinT], the anti-EGFR antibody panitumumab, the anti erbB1 antibody cetuximab [Erbitux, C225] and any growth factor or growth factor receptor antibodies disclosed by Stern et al. Critical reviews inoncology/haematology, 2005, Vol. 54, pp 11-29); such inhibitors also include tyrosine kinase inhibitors, for example inhibitors of the epidermal growth factor family (for example EGFR family tyrosine kinase inhibitors such as N-(3-chloro-4-fluorophenyl)-7-methoxy-6-(3-morpholinopropoxy)quinazolin-4-amine (gefitinib, ZD1839), N-(3-ethynylphenyl)-6,7-bis(2-methoxyethoxy)quinazolin-4-amine (erlotinib, OSI 774) and 6-acrylamido-N-(3-chloro-4-fluorophenyl)-7-(3-morpholinopropoxy)-quinazolin-4-amine (CI 1033), erbB2 tyrosine kinase inhibitors such as lapatinib, inhibitors of the hepatocyte growth factor family, inhibitors of the platelet-derived growth factor family such as imatinib, inhibitors of serine/threonine kinases (for example Ras/Raf signalling inhibitors such as farnesyl transferase inhibitors, for example sorafenib (BAY 43-9006)), inhibitors of cell signalling through MEK and/or AKT kinases, inhibitors of the hepatocyte growth factor family, c-kit inhibitors, abl kinase inhibitors, IGF receptor (insulin-like growth factor) kinase inhibitors; aurora kinase inhibitors (for example AZD1152, PH739358, VX-680, MLN8054, R763, MP235, MP529, VX-528 AND AX39459) and cyclin dependent kinase inhibitors such as CDK2 and/or CDK4 inhibitors;

(v) antiangiogenic agents such as those which inhibit the effects of vascular endothelial growth factor, [for example the anti vascular endothelial cell growth factor antibody bevacizumab (AvastinT) and VEGF receptor tyrosine kinase inhibitors such as 4-(4-bromo-2-fluoroanilino)-6-methoxy-7-(1-methylpiperidin-4-ylmethoxy)quinazoline (ZD6474; Example 2 within WO 01/32651), 4-(4-fluoro-2-methylindol-5-yloxy)-6-methoxy-7-(3-pyrrolidin-1-ylpropoxy)quinazoline (AZD2171; Example 240 within WO 00/47212), vatalanib (PTK787; WO 98/35985) and SU 1248 (sunitinib; WO 01/60814), compounds such as those disclosed in International Patent Applications WO97/22596, WO 97/30035, WO 97/32856 and WO 98/13354 and compounds that work by other mechanisms (for example linomide, inhibitors of integrin avb3 function and angiostatin)];

(vi) vascular damaging agents such as Combretastatin A4 and compounds disclosed in International Patent Applications WO 99/02166, WO 00/40529, WO 00/41669, WO 01/92224, WO 02/04434 and WO 02/08213;

(vii) antisense therapies, for example those which are directed to the targets listed above, such as ISIS 2503, an anti-ras antisense;

(viii) gene therapy approaches, including for example approaches to replace aberrant genes such as aberrant p53 or aberrant BRCA1 or BRCA2, GDEPT (gene directed enzyme pro drug therapy) approaches such as those using cytosine deaminase, thymidine kinase or a bacterial nitroreductase enzyme and approaches to increase patient tolerance to chemotherapy or radiotherapy such as multi drug resistance gene therapy; and (ix) immunotherapy approaches, including for example ex vivo and in vivo approaches to increase the immunogenicity of patient tumour cells, such as transfection with cytokines such as interleukin 2, interleukin 4 or granulocyte macrophage colony stimulating factor, approaches to decrease T cell anergy, approaches using transfected immune cells such as cytokine transfected dendritic cells, approaches using cytokine transfected tumour cell lines and approaches using anti idiotypic antibodies A combination of particular interest is with docetaxel. Other possible combinations of interest include with gemcitabine, cisplatin and the camptothecin prodrug irinotecan.

Administration

The active compound or pharmaceutical composition comprising the active compound may be administered to a subject by any convenient route of administration, whether systemically/peripherally or at the site of desired action, including but not limited to, oral (e.g. by ingestion); topical (including e.g. transdermal, intranasal, ocular, buccal, and sublingual); pulmonary (e.g. by inhalation or insufflation therapy using, e.g. an aerosol, e.g. through mouth or nose); rectal; vaginal; parenteral, for example, by injection, including subcutaneous, intradermal, intramuscular, intravenous, intraarterial, intracardiac, intrathecal, intraspinal, intracapsular, subcapsular, intraorbital, intraperitoneal, intratracheal, subcuticular, intraarticular, subarachnoid, and intrasternal; by implant of a depot, for example, subcutaneously or intramuscularly. The subject may be a eukaryote, an animal, a vertebrate animal, a mammal, a rodent (e.g. a guinea pig, a hamster, a rat, a mouse), murine (e.g. a mouse), canine (e.g. a dog), feline (e.g. a cat), equine (e.g. a horse), a primate, simian (e.g. a monkey or ape), a monkey (e.g. marmoset, baboon), an ape (e.g. gorilla, chimpanzee, orangutan, gibbon), or a human.

Formulations

While it is possible for the tartrate salt to be administered alone, it is preferable to present it as a pharmaceutical composition (e.g. formulation) comprising at least one tartrate salt, as defined above, together with one or more pharmaceutically acceptable carriers, adjuvants, excipients, diluents, fillers, buffers, stabilisers, preservatives, lubricants, or other materials well known to those skilled in the art and optionally other therapeutic or prophylactic agents.

Thus, the present invention further provides pharmaceutical compositions, as defined above, and methods of making a pharmaceutical composition comprising admixing at least one tartrate salt, as defined above, together with one or more pharmaceutically acceptable carriers, excipients, buffers, adjuvants, stabilisers, or other materials, as described herein.

The term "pharmaceutically acceptable" as used herein pertains to compounds, materials, compositions, and/or dosage forms which are, within the scope of sound medical judgement, suitable for use in contact with the tissues of a subject (e.g. human) without excessive toxicity, irritation, allergic response, or other problem or complication, commensurate with a reasonable benefit/risk ratio. Each carrier, excipient, etc. must also be "acceptable" in the sense of being compatible with the other ingredients of the formulation.

Suitable carriers, excipients, etc. can be found in standard pharmaceutical texts, for example, Remington's Pharmaceutical Sciences, 18th edition, Mack Publishing Company, Easton, Pa., 1990.

The formulations may conveniently be presented in unit dosage form and may be prepared by any methods well known in the art of pharmacy. Such methods include the step of bringing into association the tartrate salt with the carrier which constitutes one or more accessory ingredients. In general, the formulations are prepared by uniformly and intimately bringing into association the tartrate salt with liquid carriers or finely divided solid carriers or both, and then if necessary shaping the product.

Formulations may be in the form of liquids, solutions, suspensions, emulsions, elixirs, syrups, tablets, losenges, granules, powders, capsules, cachets, pills, ampoules, suppositories, pessaries, ointments, gels, pastes, creams, sprays, mists, foams, lotions, oils, boluses, electuaries, or aerosols.

Formulations suitable for oral administration (e.g. by ingestion) may be presented as discrete units such as capsules, cachets or tablets, each containing a predetermined amount of the tartrate salt; as a powder or granules; as a solution or suspension in an aqueous or non-aqueous liquid; or as an oil-in-water liquid emulsion or a water-in-oil liquid emulsion; as a bolus; as an electuary; or as a paste.

Preferably, the formulation is suitable for oral administration.

A tablet may be made by conventional means, e.g., compression or moulding, optionally with one or more accessory ingredients. Compressed tablets may be prepared by compressing in a suitable machine the tartrate salt in a free-flowing form such as a powder or granules, optionally mixed with one or more binders (e.g. povidone, gelatin, acacia, sorbitol, tragacanth, hydroxypropylmethyl cellulose); fillers or diluents (e.g. lactose, microcrystalline cellulose, calcium hydrogen phosphate); lubricants (e.g. magnesium stearate, talc, silica); disintegrants (e.g. sodium starch glycolate, cross-linked povidone, cross-linked sodium carboxy methyl cellulose); surface-active or dispersing or wetting agents (e.g. sodium lauryl sulfate); and preservatives (e.g. methyl p-hydroxybenzoate, propyl p-hydroxybenzoate, sorbic acid). Moulded tablets may be made by moulding in a suitable machine a mixture of the powdered compound moistened with an inert liquid diluent. The tablets may optionally be coated or scored and may be formulated so as to provide slow or controlled release of the tartrate salt therein using, for example, hydroxypropylmethyl cellulose in varying proportions to provide the desired release profile. Tablets may optionally be provided with an enteric coating, to provide release in parts of the gut other than the stomach.

Formulations suitable for topical administration (e.g. transdermal, intranasal, ocular, buccal, and sublingual) may be formulated as an ointment, cream, suspension, lotion, powder, solution, past, gel, spray, aerosol, or oil. Alternatively, a formulation may comprise a patch or a dressing such as a bandage or adhesive plaster impregnated with the tartrate salt and optionally one or more excipients or diluents.

Formulations suitable for topical administration in the mouth include losenges comprising the tartrate salt in a flavoured basis, usually sucrose and acacia or tragacanth; pastilles comprising the tartrate salt in an inert basis such as gelatin and glycerin, or sucrose and acacia; and mouthwashes comprising the tartrate salt in a suitable liquid carrier.

Formulations suitable for topical administration to the eye also include eye drops wherein the tartrate salt is dissolved or suspended in a suitable carrier, especially an aqueous solvent for the tartrate salt.

Formulations suitable for nasal administration, wherein the carrier is a solid, include a coarse powder having a particle size, for example, in the range of about 20 to about 500 microns which is administered in the manner in which snuff is taken, i.e. by rapid inhalation through the nasal passage from a container of the powder held close up to the nose. Suitable formulations wherein the carrier is a liquid for administration as, for example, nasal spray, nasal drops, or by aerosol administration by nebuliser, include aqueous or oily solutions of the tartrate salt.

Formulations suitable for administration by inhalation include those presented as an aerosol spray from a pressurised pack, with the use of a suitable propellant, such as dichlorodifluoromethane, trichlorofluoromethane, dichlorotetrafluoroethane, carbon dioxide, or other suitable gases.

Formulations suitable for topical administration via the skin include ointments, creams, and emulsions. When formulated in an ointment, the tartrate salt may optionally be employed with either a paraffinic or a water-miscible ointment base. Alternatively, the tartrate salt may be formulated in a cream with an oil-in-water cream base. If desired, the aqueous phase of the cream base may include, for example, at least about 30% w/w of a polyhydric alcohol, i.e., an alcohol having two or more hydroxyl groups such as propylene glycol, butane-1,3-diol, mannitol, sorbitol, glycerol and polyethylene glycol and mixtures thereof. The topical formulations may desirably include a compound which enhances absorption or penetration of the tartrate salt through the skin or other affected areas. Examples of such dermal penetration enhancers include dimethylsulfoxide and related analogues.

When formulated as a topical emulsion, the oily phase may optionally comprise merely an emulsifier (otherwise known as an emulgent), or it may comprises a mixture of at least one emulsifier with a fat or an oil or with both a fat and an oil. Preferably, a hydrophilic emulsifier is included together with a lipophilic emulsifier which acts as a stabiliser. It is also preferred to include both an oil and a fat.

Together, the emulsifier(s) with or without stabiliser(s) make up the so-called emulsifying wax, and the wax together with the oil and/or fat make up the so-called emulsifying ointment base which forms the oily dispersed phase of the cream formulations.

Suitable emulgents and emulsion stabilisers include Tween 60, Span 80, cetostearyl alcohol, myristyl alcohol, glyceryl monostearate and sodium lauryl sulphate. The choice of suitable oils or fats for the formulation is based on achieving the desired cosmetic properties, since the solubility of the tartrate salt in most oils likely to be used in pharmaceutical emulsion formulations may be very low. Thus the cream should preferably be a non-greasy, non-staining and washable product with suitable consistency to avoid leakage from tubes or other containers. Straight or branched chain, mono- or dibasic alkyl esters such as di-isoadipate, isocetyl stearate, propylene glycol diester of coconut fatty acids, isopropyl myristate, decyl oleate, isopropyl palmitate, butyl stearate, 2-ethylhexyl palmitate or a blend of branched chain esters known as Crodamol CAP may be used, the last three being preferred esters. These may be used alone or in combination depending on the properties required.

Alternatively, high melting point lipids such as white soft paraffin and/or liquid paraffin or other mineral oils can be used.

Formulations suitable for rectal administration may be presented as a suppository with a suitable base comprising, for example, cocoa butter or a salicylate.

Formulations suitable for vaginal administration may be presented as pessaries, tampons, creams, gels, pastes, foams or spray formulations containing in addition to the tartrate salt, such carriers as are known in the art to be appropriate.

Formulations suitable for parenteral administration (e.g. by injection, including cutaneous, subcutaneous, intramuscular, intravenous and intradermal), include aqueous and non-aqueous isotonic, pyrogen-free, sterile injection solutions which may contain anti-oxidants, buffers, preservatives, stabilisers, bacteriostats, and solutes which render the formulation isotonic with the blood of the intended recipient; and aqueous and non-aqueous sterile suspensions which may include suspending agents and thickening agents, and liposomes or other microparticulate systems which are designed to target the compound to blood components or one or more organs. Examples of suitable isotonic vehicles for use in such formulations include Sodium Chloride Injection, Ringer's Solution, or Lactated Ringer's Injection. Typically, the concentration of the tartrate salt in the solution is from about 1 ng/ml to about 10 µg/ml, for example from about 10 ng/ml to about 1 pg/ml. The formulations may be presented in unit-dose or multi-dose sealed containers, for example, ampoules and vials, and may be stored in a freeze-dried (lyophilised) condition requiring only the addition of the sterile liquid carrier, for example water for injections, immediately prior to use. Extemporaneous injection solutions and suspensions may be prepared from sterile powders, granules, and tablets. Formulations may be in the form of liposomes or other microparticulate systems which are designed to target the tartrate salt to blood components or one or more organs.

Dosage

It will be appreciated that appropriate dosages of the tartrate salt, and compositions comprising the tartrate salt, can vary from patient to patient. Determining the optimal dosage will generally involve the balancing of the level of therapeutic benefit against any risk or deleterious side effects of the treatments of the present invention. The selected dosage level will depend on a variety of factors including, but not limited to, the activity of the particular compound, the route of administration, the time of administration, the rate of excretion of the compound, the duration of the treatment, other drugs, compounds, and/or materials used in combination, and the age, sex, weight, condition, general health, and prior medical history of the patient. The amount of compound and route of administration will ultimately be at the discretion of the physician, although generally the dosage will be to achieve local concentrations at the site of action which achieve the desired effect without causing substantial harmful or deleterious side-effects.

Administration in vivo can be effected in one dose, continuously or intermittently (e.g. in divided doses at appropriate intervals) throughout the course of treatment. Methods of determining the most effective means and dosage of administration are well known to those of skill in the art and will vary with the formulation used for therapy, the purpose of the therapy, the target cell being treated, and the subject being treated. Single or multiple administrations can be carried out with the dose level and pattern being selected by the treating physician.

In general, a suitable dose of the tartare salt is in the range of about 100 pg to about 250 mg per kilogram body weight of the subject per day.

It will be understood that the invention disclosed and defined in this specification extends to all alternative combinations of two or more of the individual features mentioned or evident from the text or drawings. All of these different combinations constitute various alternative aspects of the invention.

EXAMPLES

The invention will now be described by reference to the following non-limiting examples.

Synthesis and Characterisation of the Tartrate Salt of the Compound of Formula I (Formula I)

Methods of Analysis

X-Ray Powder Diffraction (XRPD)

XRPD analysis was carried out on a PANalytical Xpert pro, scanning the samples between 3 and 35° 2θ. The material was gently ground to release any agglomerates and loaded onto a multi-well plate with Mylar polymer film to support the sample. The multi-well plate was then placed into the diffractometer and analysed using Cu K radiation ($\alpha_1$ λ=1.54060 Å; $\alpha_2$=1.54443 Å; β=1.39225 Å; $\alpha_1$: $\alpha_2$ ratio=0.5) running in transmission mode (step size 0.0130° 2θ) using 40 kV/40 mA generator settings.

Polarised Light Microscopy (PLM)

The presence of crystallinity (birefringence) was determined using an Olympus BX50 polarising microscope, equipped with a Motic camera and image capture software (Motic Images Plus 2.0). All images were recorded using the 20× objective, unless otherwise stated.

Thermogravimetric Analysis (TG/DTA)

Approximately, 5 mg of material was weighed into an open aluminium pan and loaded into a simultaneous thermogravimetric/differential thermal analyser (TG/DTA) and held at room temperature. The sample was then heated at a rate of 10° C./min from 20° C. to 400° C. during which time the change in sample weight was recorded along with any differential thermal events (DTA). Nitrogen was used as the purge gas, at a flow rate of 300 cm$^3$/min.

Differential Scanning Calorimetry (DSC)

Approximately, 5 mg of material was weighed into an aluminum DSC pan and sealed non-hermetically with a pierced aluminum lid. The sample pan was then loaded into a Seiko DSC6200 (equipped with a cooler) cooled and held at 20° C. Once a stable heat-flow response was obtained, the sample and reference were heated to melting (if possible) at a scan rate of 10° C./min and the resulting heat flow response monitored. Nitrogen was used as the purge gas, at a flow rate of 50 cm$^3$/min.

Infrared Spectroscopy (IR)

Infrared spectroscopy was carried out on a Bruker ALPHA P spectrometer. Sufficient material was placed onto the centre of the plate of the spectrometer and the spectra were obtained using the following parameters:

| | |
|---|---|
| Resolution: | 4 cm$^{-1}$ |
| Background Scan Time: | 16 scans |
| Sample Scan Time: | 16 scans |
| Data Collection: | 4000 to 400 cm$^{-1}$ |
| Result Spectrum: | Transmittance |
| Software: | OPUS version 6 |

Nuclear Magnetic Resonance (NMR)

NMR experiments were performed on a Bruker AVIIIHD spectrometer equipped with a DCH cryoprobe operating at 500.12 MHz for protons and fluorine. Experiments were performed in deuterated DMSO-d6 and each sample was prepared to ca. 10 mM concentration.

A $^1$H-$^{13}$C HSQC NMR was also collected on the same instrument.

Dynamic Vapour Sorption (DVS)

Approximately 10-20 mg of sample was placed into a mesh vapour sorption balance pan and loaded into the DVS-1 dynamic vapour sorption balance by Surface Measurement Systems. The sample was subjected to a ramping profile from 40-90% relative humidity (RH) at 10% increments, maintaining the sample at each step until a stable weight had been achieved (dm/dt 0.004%, minimum step length 30 minutes, maximum step length 500 minutes) at 25° C. After completion of the sorption cycle, the sample was dried using the same procedure to 0% RH and then a second sorption cycle back to 40% RH. Two cycles were performed. The weight change during the sorption/desorption cycles were plotted, allowing for the hygroscopic nature of the sample to be determined. XRPD analysis was then carried out on any solid retained.

Gravimetric Vapour Sorption (GVS)

Approximately 10-20 mg of sample was placed into a mesh vapour sorption balance pan and loaded into an IGASorp Moisture Sorption Analyser balance by Hiden Analytical. The sample was subjected to a ramping profile from 40-90% relative humidity (RH) at 10% increments, maintaining the sample at each step until a stable weight had been achieved (98% step completion, minimum step length 30 minutes, maximum step length 60 minutes) at 25° C. After completion of the sorption cycle, the sample was dried using the same procedure to 0% RH, and finally taken back to the starting point of 40% RH. Two cycles were performed. The weight change during the sorption/desorption cycles were plotted, allowing for the hygroscopic nature of the sample to be determined.

High Performance Liquid Chromatography-Ultraviolet Detection (HPLC-UV)

| | |
|---|---|
| Column: | Zorbax SB-C18, 150 mm × 4.6 mm, 3.5 μm |
| Column Temperature: | 50° C. |
| Autosampler Temperature: | Ambient |
| UV wavelength: | 275 nm |
| Injection Volume: | 5 μL |
| Flow Rate: | 1.0 mL/min |
| Mobile Phase A: | 0.1% TFA in Deionised Water |
| Mobile Phase B: | 0.1% TFA in Acetonitrile |
| Gradient program: | |

| Time (minutes) | Solvent B [%] |
|---|---|
| 0.0 | 5 |
| 1.0 | 5 |
| 15.0 | 95 |
| 15.1 | 95 |
| 16.0 | 5 |
| 20.0 | 5 |

Liquid Chromatography-Mass Spectrometry (LC-MS)

| | |
|---|---|
| Instrument: | Dionex Ultimate 3000 |
| Column: | ACE Excel 3 Super C18, 75 × 4.6 mm, 3.0 μm |
| Column Temperature: | 30° C. |
| Injection Volume: | 10 μL |
| Flow Rate: | 1.0 mL/min |
| Mobile Phase A: | 0.1% Formic Acid in Deionised water |
| Mobile Phase B: | 0.1% Formic Acid in Acetonitrile |
| Diluent: | 50:50 Water: Acetonitrile |
| Needle Wash: | Acetonitrile |
| PDA Range: | 190-400 nm |
| Gradient program: | |

| Time (minutes) | Solvent B [%] |
| --- | --- |
| 0.00 | 5 |
| 12.00 | 95 |
| 15.00 | 95 |
| 15.10 | 5 |
| 20.00 | 5 |

Comparison of Tartrate Salt of Compound of Formula I Vs its Free Base

|  | Free base | L-Tartrate |
| --- | --- | --- |
| Solvent system | N/A | Acetone |
| Birefringence | Birefringent | Birefringent |
| Morphology | Needle-like | Needle-like |
| 1 H NMR | Consistent with structure | 1:1 salt |
| TG/DTA |  |  |
| Mass loss | 2.71% weight loss (0.8eq water) at ~47° C. | — |
| Melt onset | ~149° C. | ~173° C. |
| Degradation | >300° C. | >200° C. |
| DSC | Melt onset ~147° C. | Melt onset ~173° C. |
| HPLC Purity | 99.4% | 99.8% |
| DVS/GVS |  |  |
| Hygroscopicity | Uptake of 5 wt % at 90% R.H. | Uptake of 0.6 wt % 90% R.H. |
| Thermodynamic Solubility |  |  |
| Water | <0.1 mg/ml | 0.9 mg/ml |
| pH 1.0 | 0.3 mg/ml | 0.3 mg/ml |
| pH 4.5 | 11.9 mg/ml | 0.3 mg/ml |
| pH 6.8 | <0.1 mg/ml | 0.2 mg/ml |

Synthesis of the L-Tartrate Salt of the Compound of Formula I—Method 1

The Formula I L-tartrate was prepared using the following method:
- Approximately 500 mg of Formula I free base was weighed into a scintillation vial.
- 3 mL acetone was added to form a slurry and 995 µL of L-tartaric acid 1 M stock solution in THF (1.05 molar equiv.) was slowly pipetted into the slurry.
- The slurry was then gently swirled, capped and set to thermally cycle between ambient temperature and 40° C. (4-hour cycles) in an incubator shaker for approx. 72 hours.
- After this time, the vial was removed from the incubator shaker and a sub-sample of the solid was analyzed by XRPD to check if the desired pattern had been reproduced. The sample was observed by XRPD and designated L-tartrate pattern 1.
- The solid was then isolated under vacuum on a Buchner funnel using Whatman grade 1 filter paper (42.5 mm 0) and the solids were allowed to dry on the filter bed under vacuum for a further 15 minutes. The solid was then transferred to a pre-weighed scintillation vial and weighed to obtain the final mass of 573.3 mg, which was approximately 89% yield based upon a L-tartrate mono-salt. An XRPD was collected on the dried solid and was observed to be L-tartrate Pattern 1.
- The L-tartrate Pattern 1 material was then characterized by PLM, TG/DTA, DSC, $^1$H-NMR, HPLC purity, GVS (with post-GVS XRPD), FT-IR and used in 7-day stability, salt disproportionation, hydration and thermodynamic solubility studies.

Figure 2:
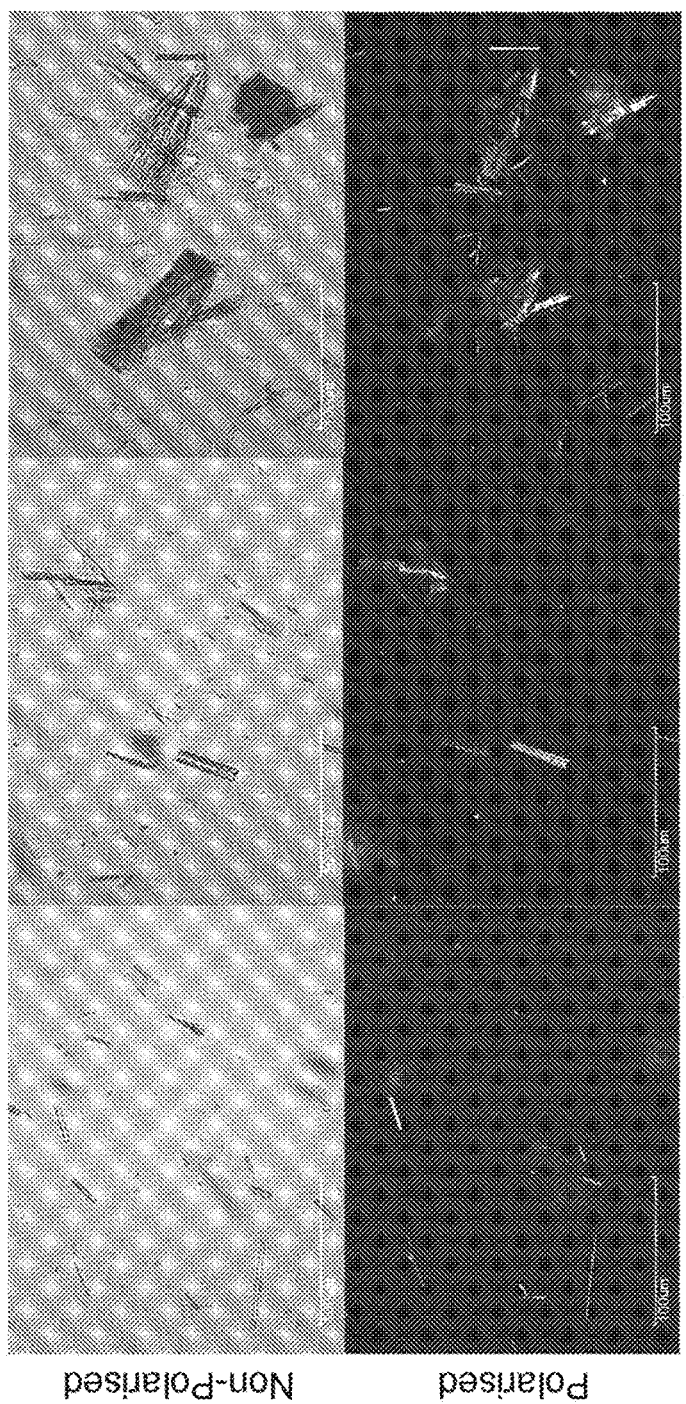
FIG. 2. PLM Images of Formula I L-tartrate Pattern 1 obtained from Method 1.
Figure 3A:
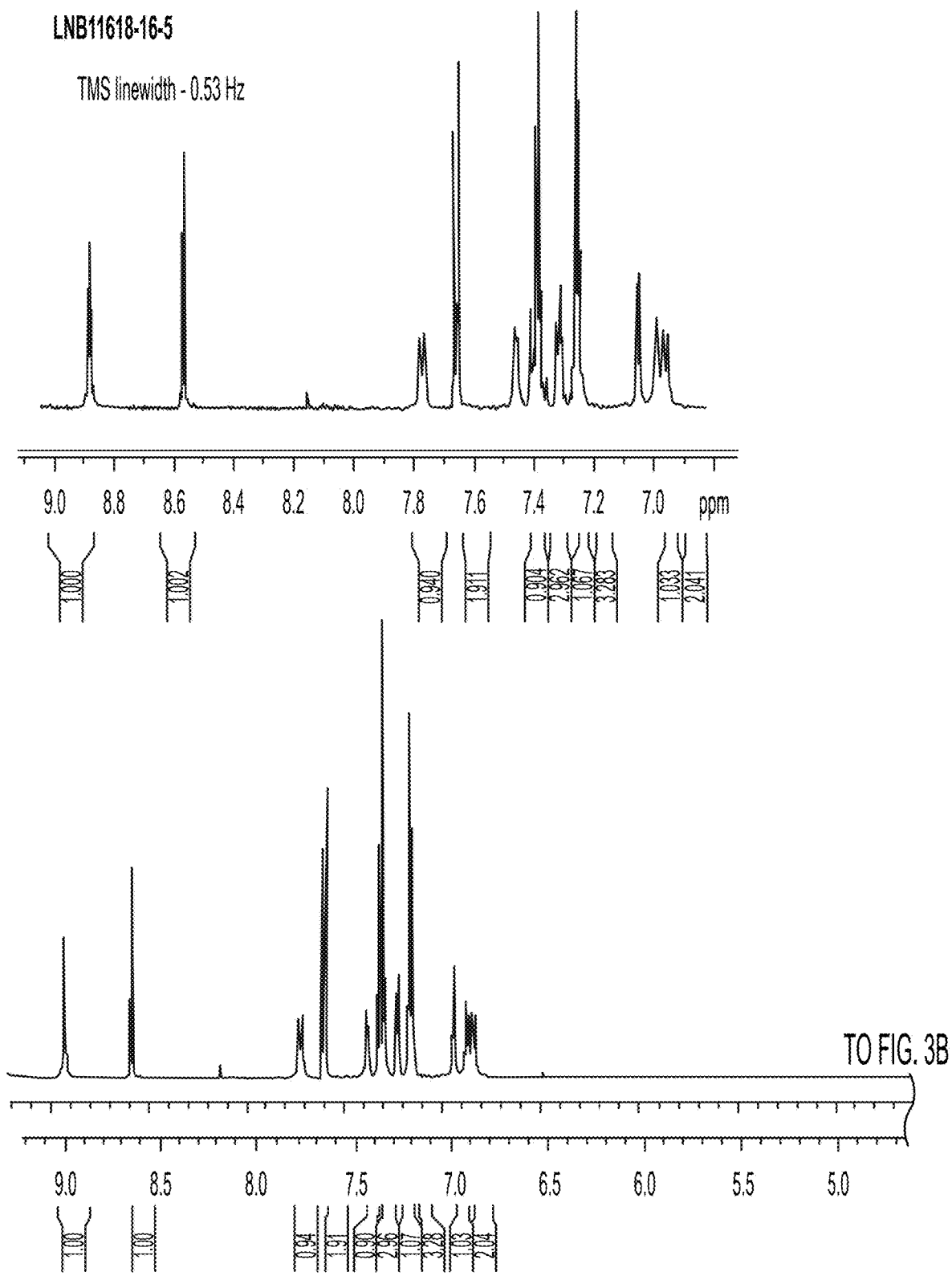
Figure 3B:
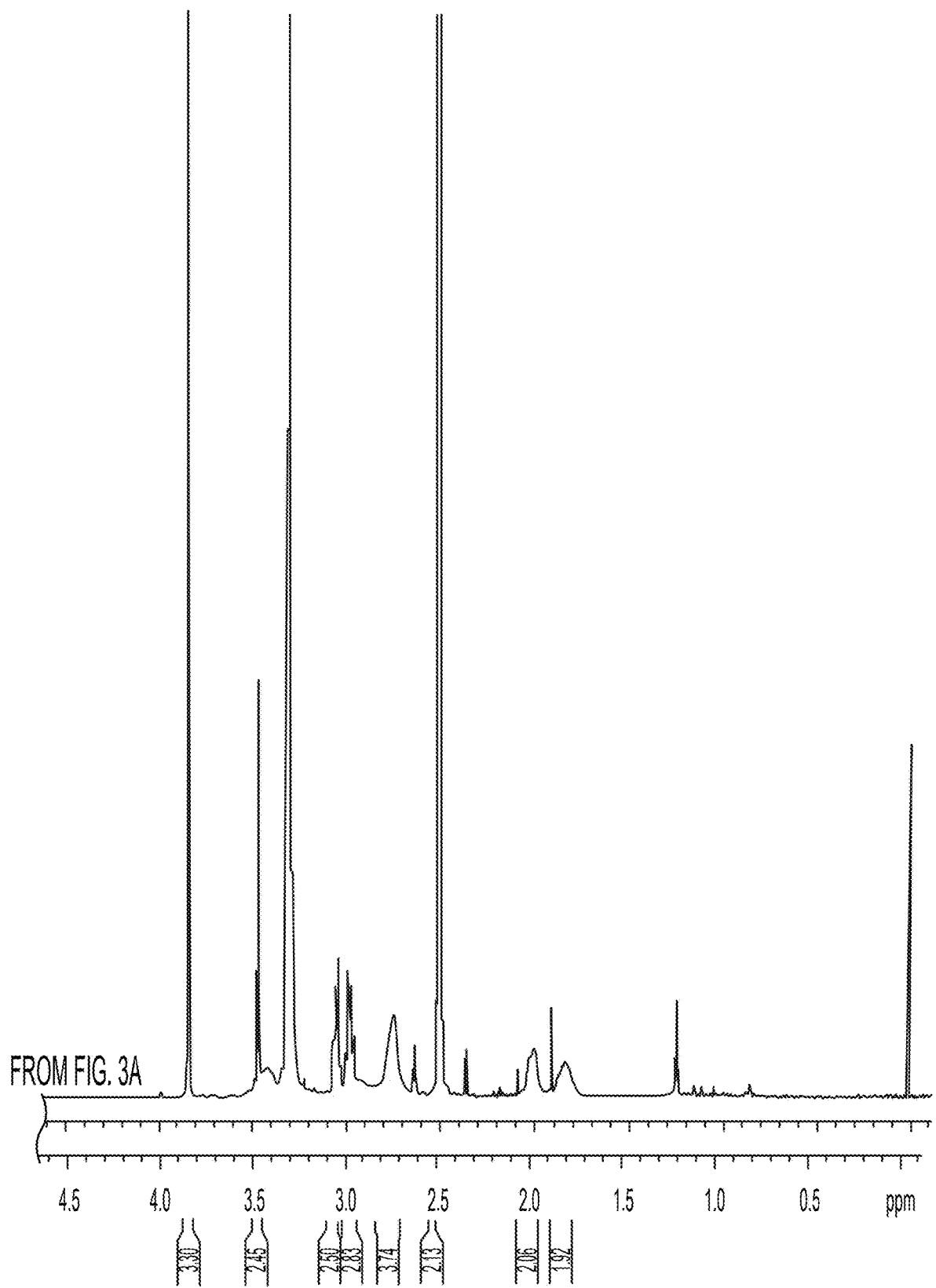
Figure 4:
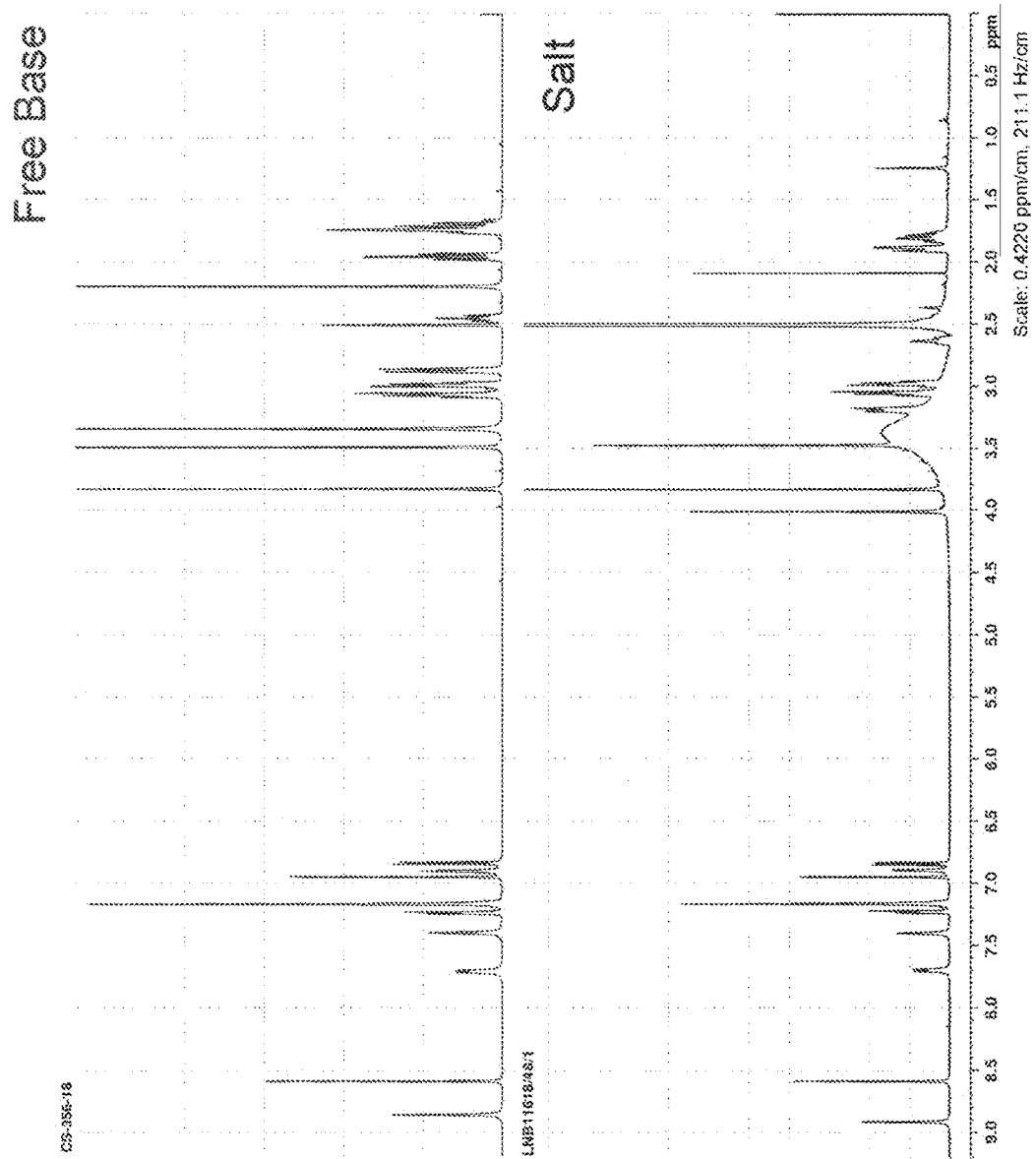
FIG. 4. Stacked 1H NMR spectra of Formula I free base and Formula I L-tartrate Pattern 1 material obtained from Method 1.
Figure 5A:
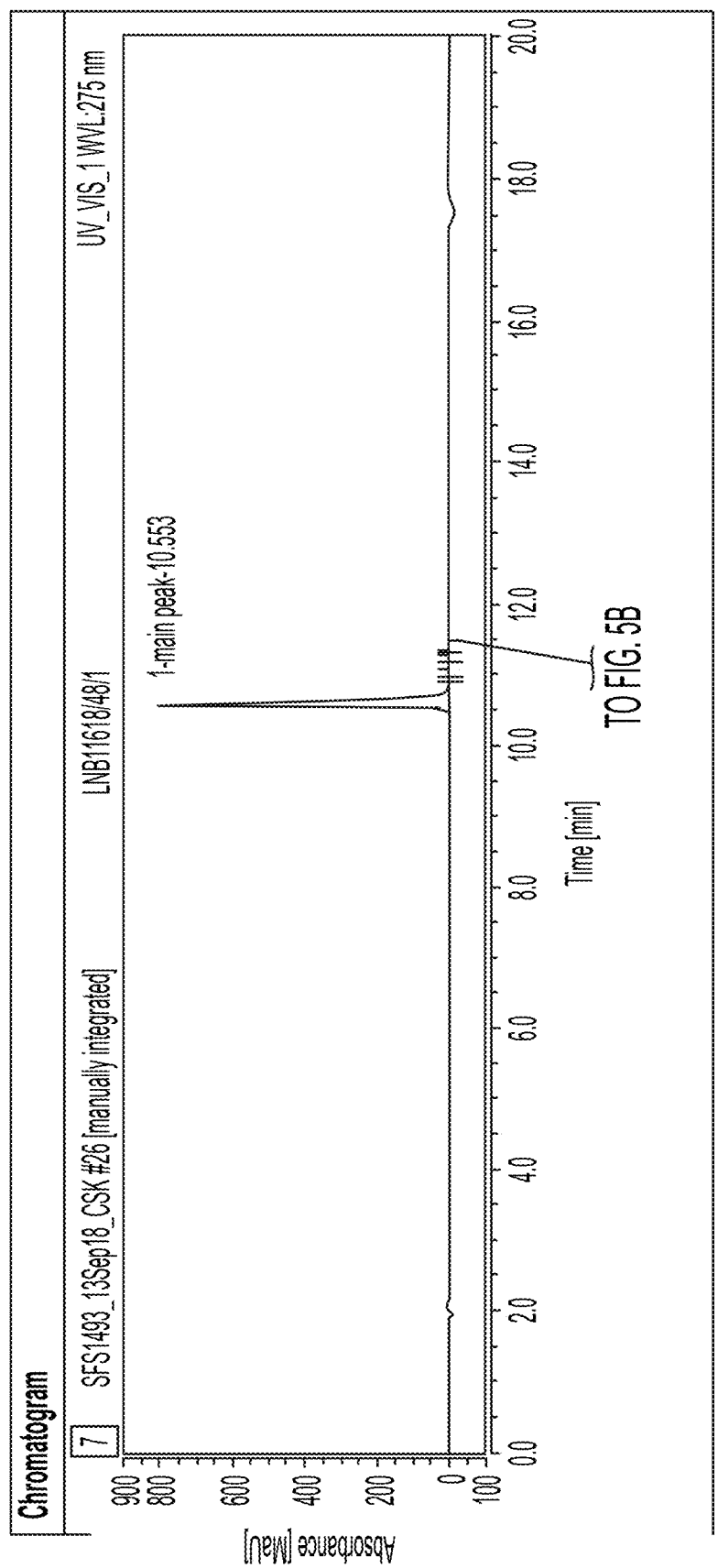
FIGS. 5A and 5B HPLC Purity Chromatogram of Formula I L-tartrate Pattern 1 material obtained from Method 1. In addition to the main peak with a retention time of 10.553, there are 4 other peaks indicated by the arrows. The retention times of those 4 peaks are more clearly tabulated in the arrowed column in the table.
Figure 5B:
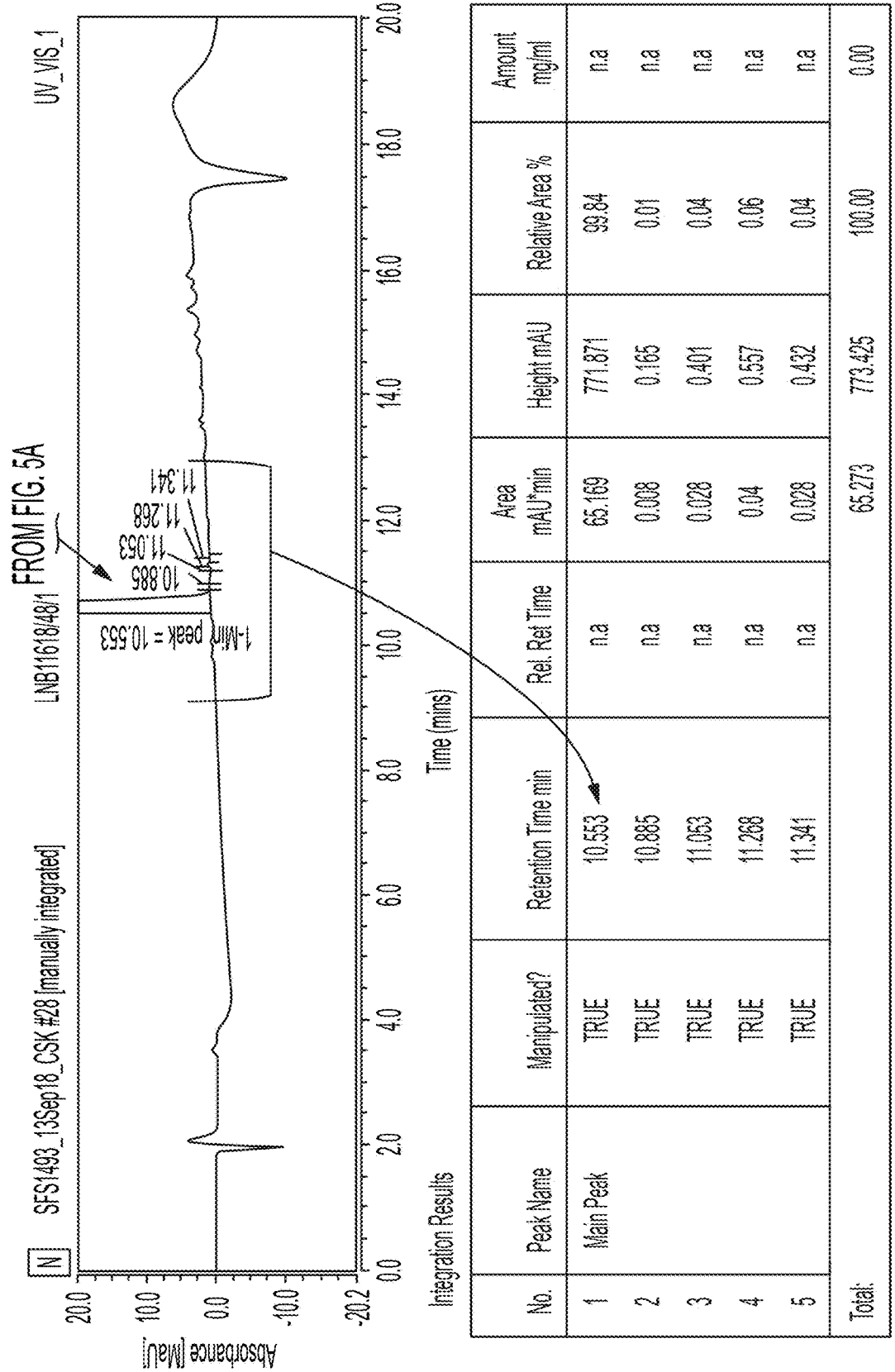
Figure 6:
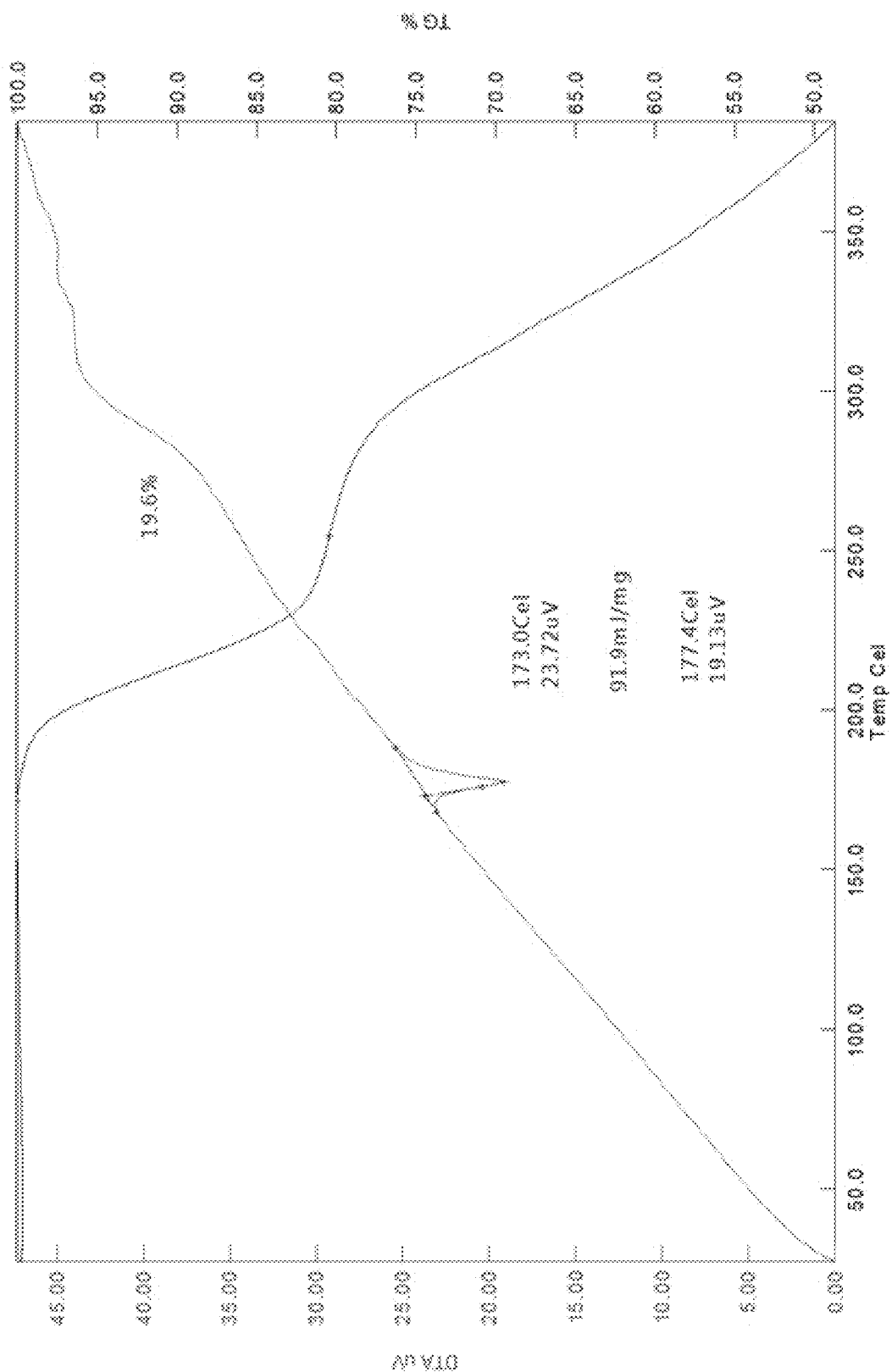
FIG. 6. TG/DT Thermogram of Formula I L-tartrate Pattern 1 obtained from Method 1.
Figure 7:
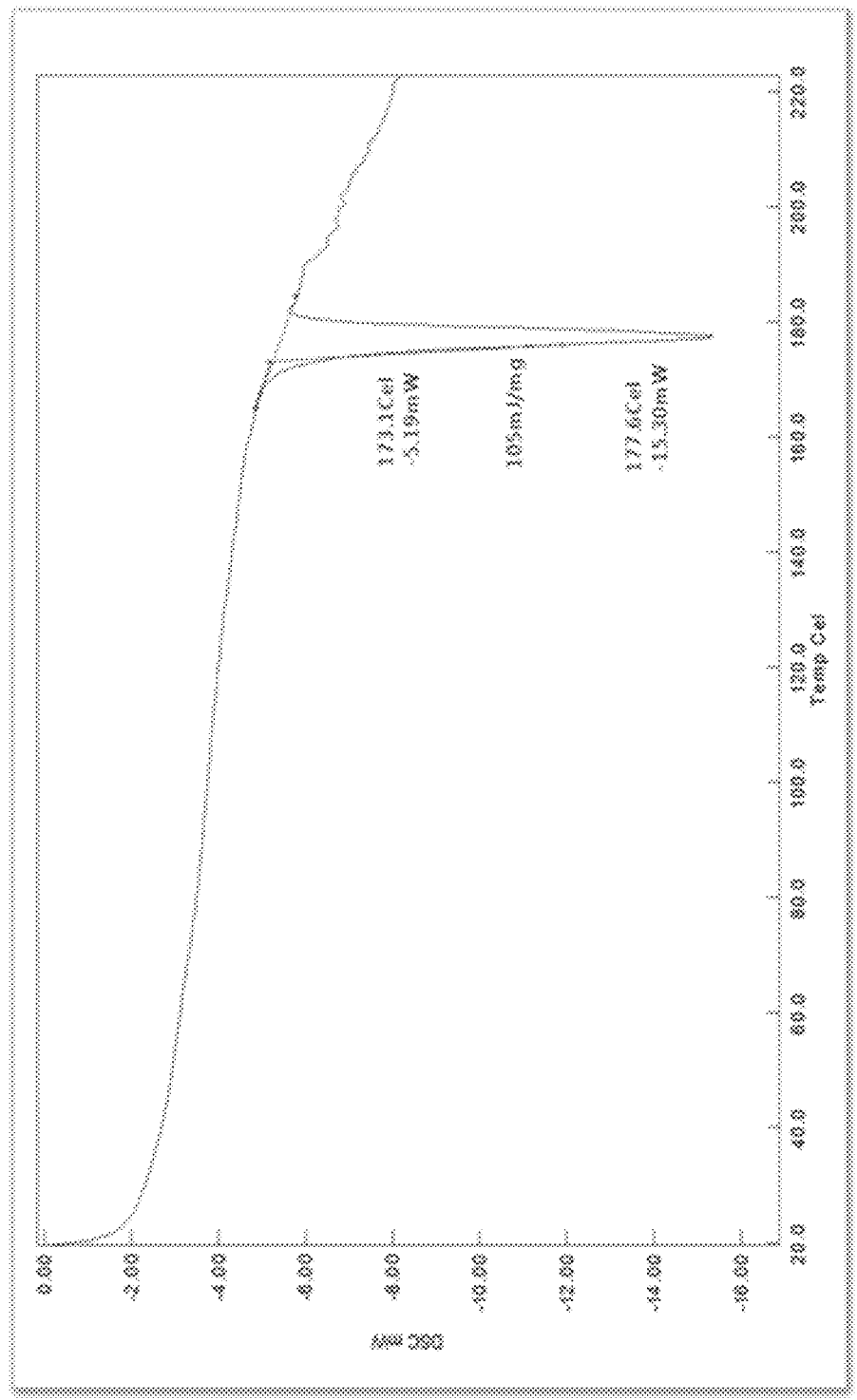
FIG. 7. DSC First Heat Thermogram of Formula I L-tartrate Pattern 1 obtained from Method 1.
Figure 8:
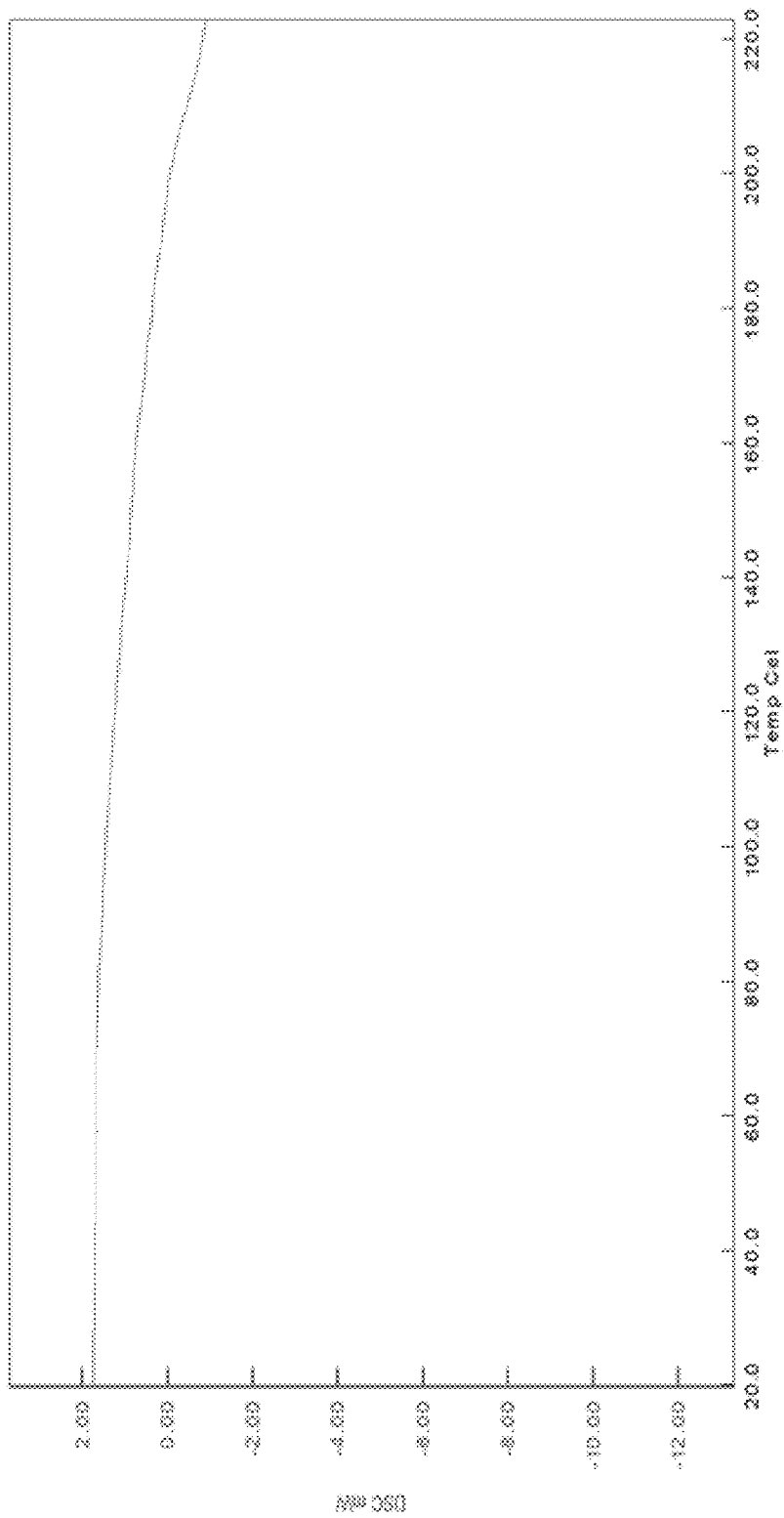
FIG. 8. DSC First Cool Thermogram of Formula I L-tartrate Pattern 1 obtained from Method 1.
Figure 9:
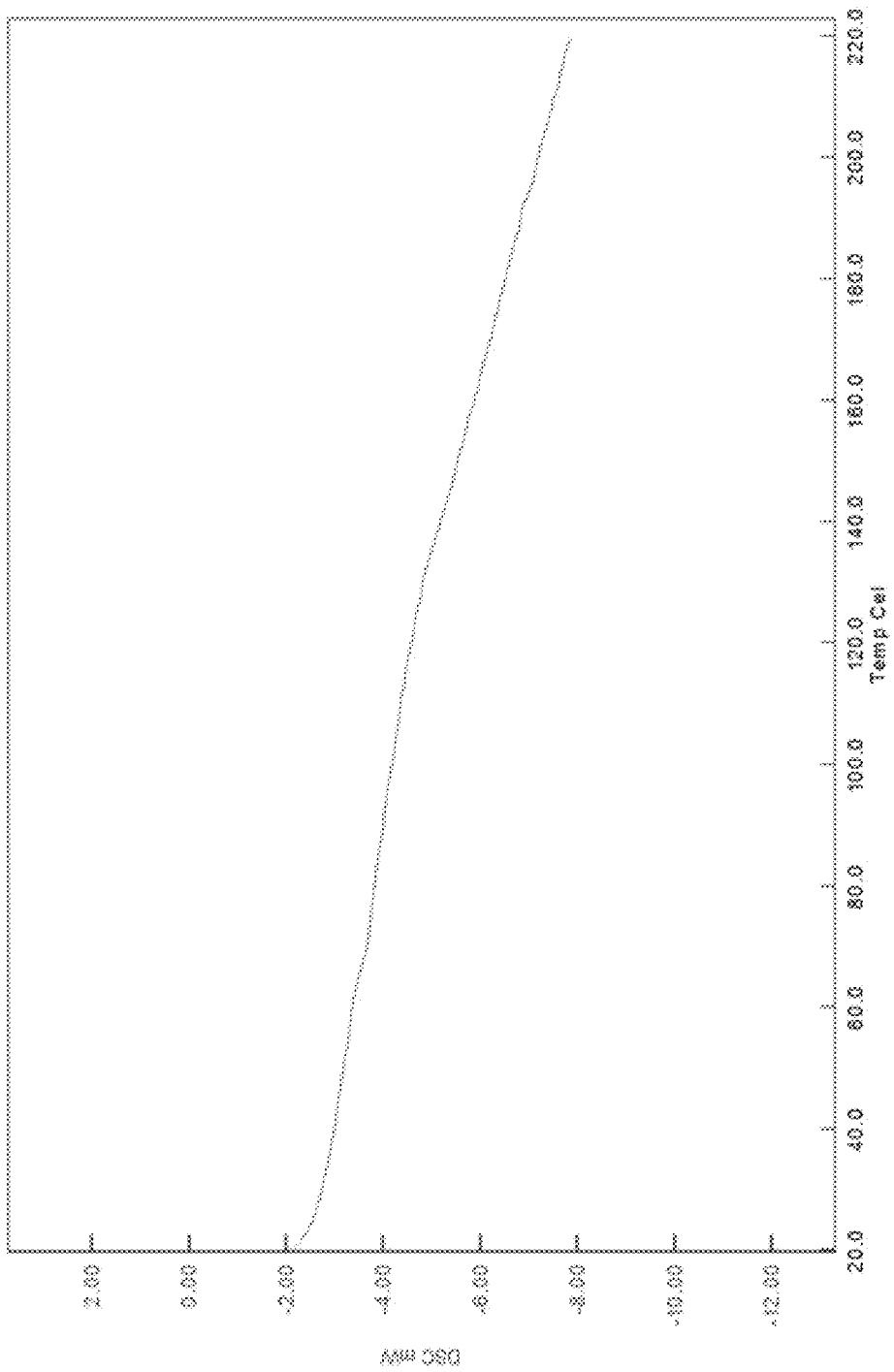
FIG. 9. DSC Second Heat Thermogram of Formula I L-tartrate Pattern 1 obtained from Method 1.
Figure 10:
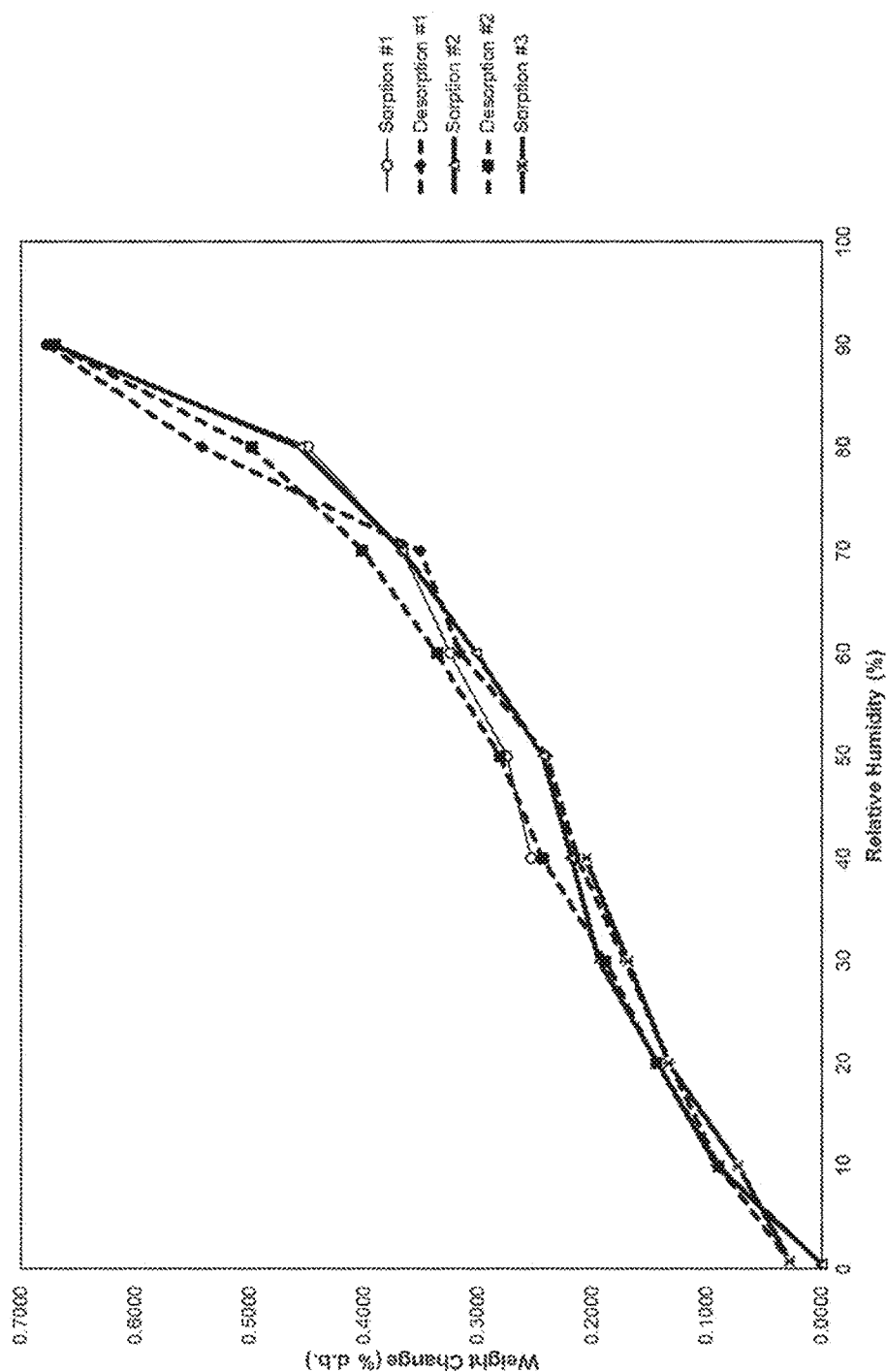
FIG. 10. GVS Isotherm Plot of Formula I L-tartrate Pattern 1 obtained from Method 1.
Figure 11:
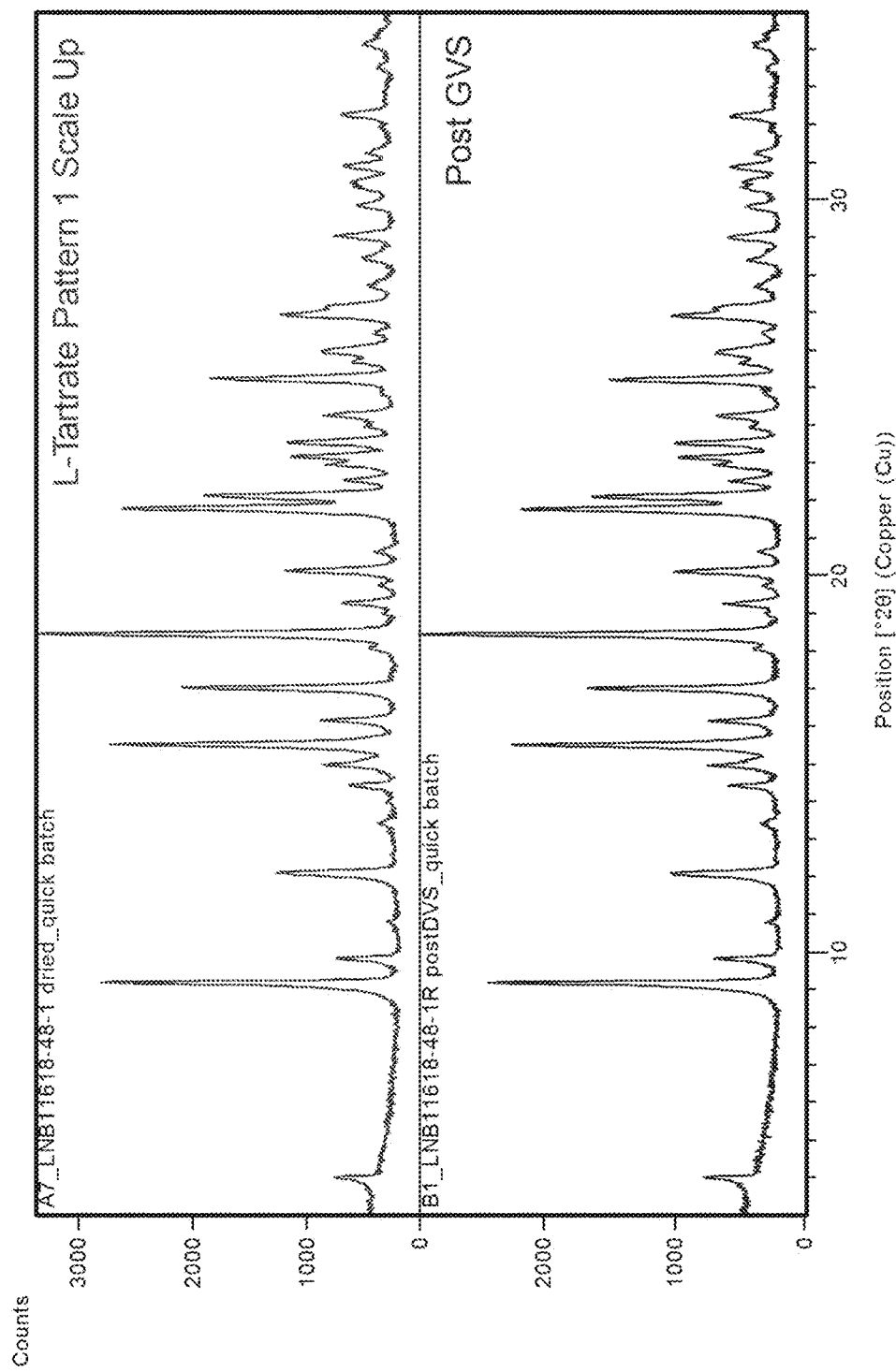
FIG. 11. Post-GVS XRPD Diffractogram of Formula I L-tartrate Pattern 1 obtained from Method 1.
Figure 12:
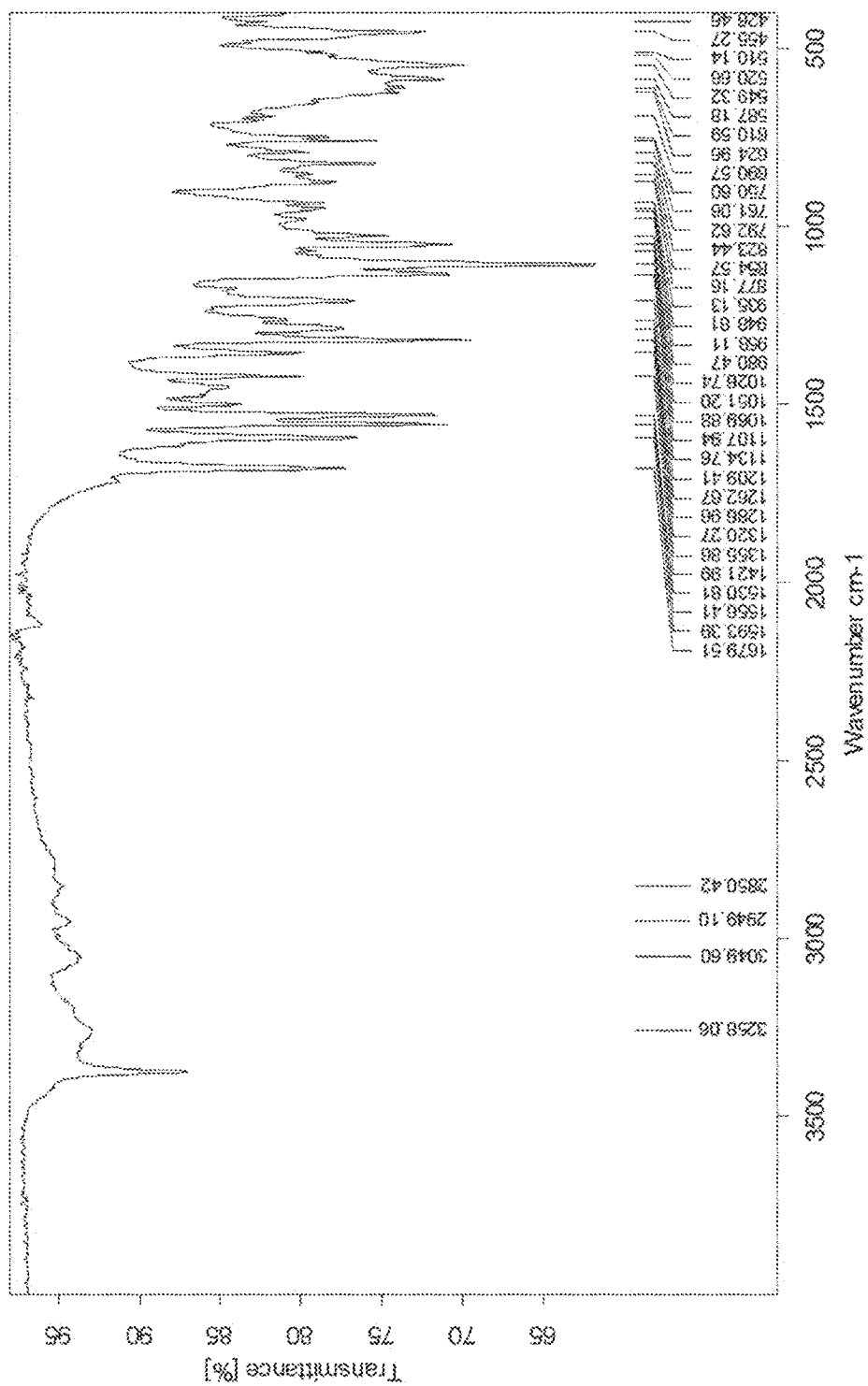
FIG. 12. FT-IR Trace of Formula I L-tartrate Pattern 1 obtained from Method 1.

Preparation of the Formula I L-tartrate Pattern 1 using method 1 was successful. 573.3 mg of solid was recovered, which was approximately an 89% yield based upon an anhydrous mono-salt. Characterization of the Formula I L-tartrate Pattern 1 material indicated the following:

- XRPD diffractograms in FIG. 1 of the material post-temperature cycling and post-drying were crystalline and designated Pattern 1.
- PLM images in FIG. 2 showed birefringent crystals with needle-like morphology.
- $^1$H NMR analysis in FIG. 2 and FIG. 4 showed shifts to the Formula I free base peaks and a broad water peak which gave evidence of salt formation. Integration of the L-tartaric acid singlet peak at ca. 4.01 ppm was 2H, which was consistent with a Formula I free base: L-tartaric acid ratio of 1:1; suggesting that a mono-salt was formed.
- Analysis by HPLC (FIG. 5A and FIG. 5B) gave a purity of the Formula I of 99.8% area.
- TG analysis in FIG. 6 showed no significant weight losses until the onset of degradation above ca. 200° C. This suggested that this was an anhydrous form.
- The DT trace showed an endothermic event due to melting with an onset of 173° C. and peak at 177° C. (FIG. 6)
- The DSC analysis showed an endothermic event due to melting in the first heat cycle (FIG. 7) with an onset of 173° C. and peak at 177° C. This was consistent with the TG/DTA data. No further events were seen in the subsequent cooling (FIG. 8) and second heat (FIG. 9) cycles, indicating that after the melt, no recrystallization occurred on cooling and the material remained as a molten material.
- The material was found to be slightly hygroscopic by GVS analysis (FIG. 10), with a mass uptake of 0.6 wt % observed up to 90% RH.
- XRPD analysis in FIG. 11 of the sample post-GVS experiment showed no changes to the XRPD pattern compared with the expected XRPD pattern for Formula I L-tartrate Pattern 1.
- An FT-IR trace in FIG. 12 was recorded for reference purposes.

Synthesis of the L-Tartrate Salt of the Compound of Formula I—Method 2

To test the reproducibility of L-tartrate Pattern 1 using a stock solution solvent with a higher ICH classification compared with tetrahydrofuran (class 2), a 1 M stock solution of L-tartaric acid was prepared in both acetone and in ethanol, both of which are classified to be ICH class 3 solvents.

No experiments were conducted using the stock solution in acetone due to poor solubility of L-tartaric acid in this solvent.

Preparation of L-tartrate Pattern 1 using the stock solution in ethanol was carried out as follows:
- Approximately 100 mg of Formula I free base was weighed into a scintillation vial.
- 600 µL of acetone was added to form a slurry and the vial lightly shaken.
- 199 µL of L-tartaric acid stock solution in ethanol (1.05 molar equiv.) was then slowly pipetted into the slurry.
- The vial was then capped and placed into an incubator shaker to thermal cycle between ambient temperature and 40° C. in 4-hour cycles for 24 hours. The resulting solid was analyzed by XRPD and L-tartrate Pattern 1 was observed.

The sample was then uncapped and allowed to evaporate at ambient conditions for 72 hours.

The dried sample was then analyzed by XRPD and $^1$H NMR.

Figure 13:
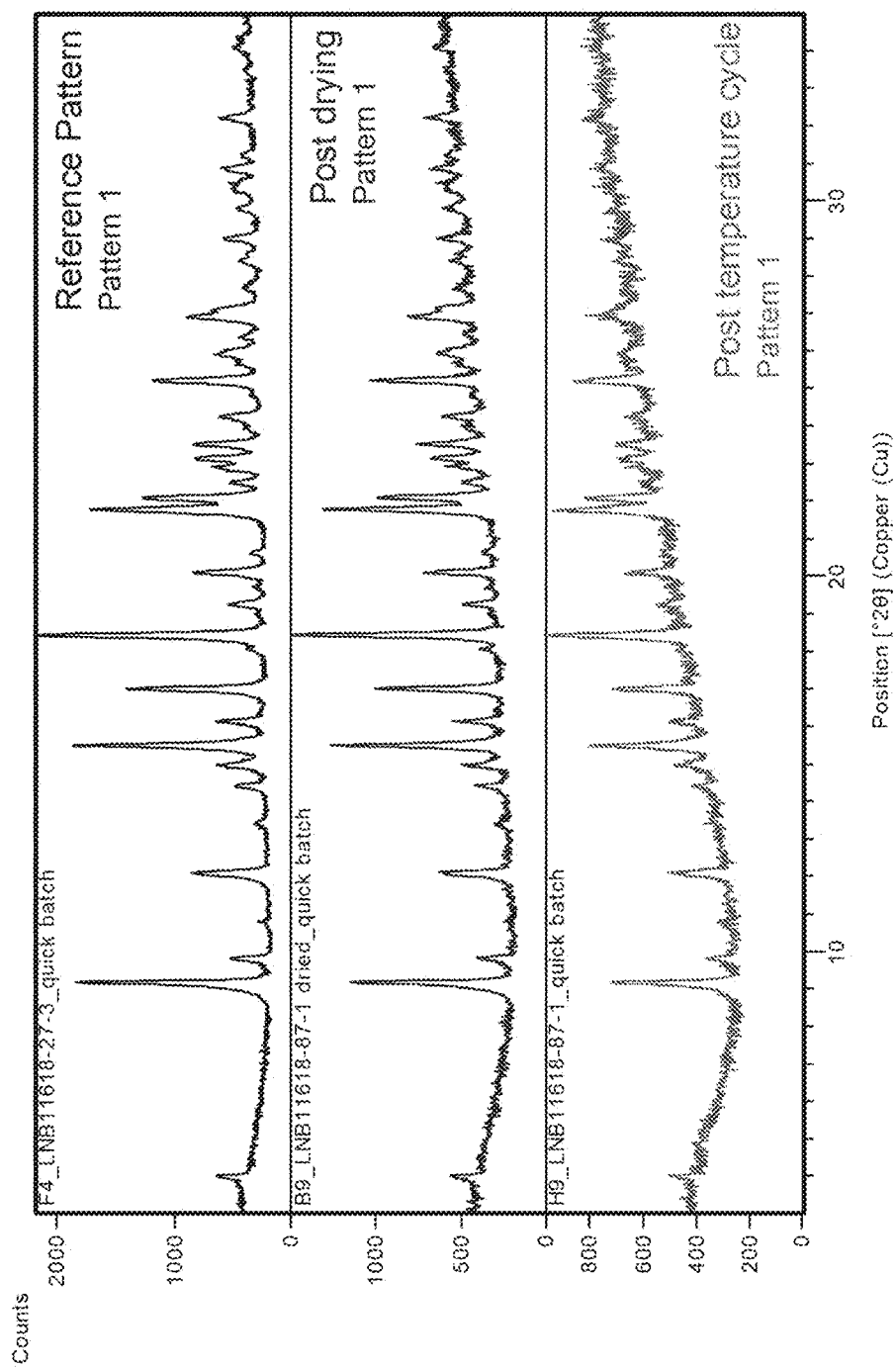
FIG. 13. XRPD Diffractograms of solids obtained from Method 2 preparation of Formula I L-tartrate Pattern 1.

Preparation of Formula I L-tartrate Pattern 1 using method 2 (use of an ethanol stock solution instead of a tetrahydrofuran stock solution) was successful and characterization of the solids obtained by XRPD and $^1$H NMR gave the following results:

The XRPD diffractogram in FIG. 13 showed comparable crystallinity to other methods and matched the expected pattern for Formula I L-tartrate Pattern 1.

Figure 14A:
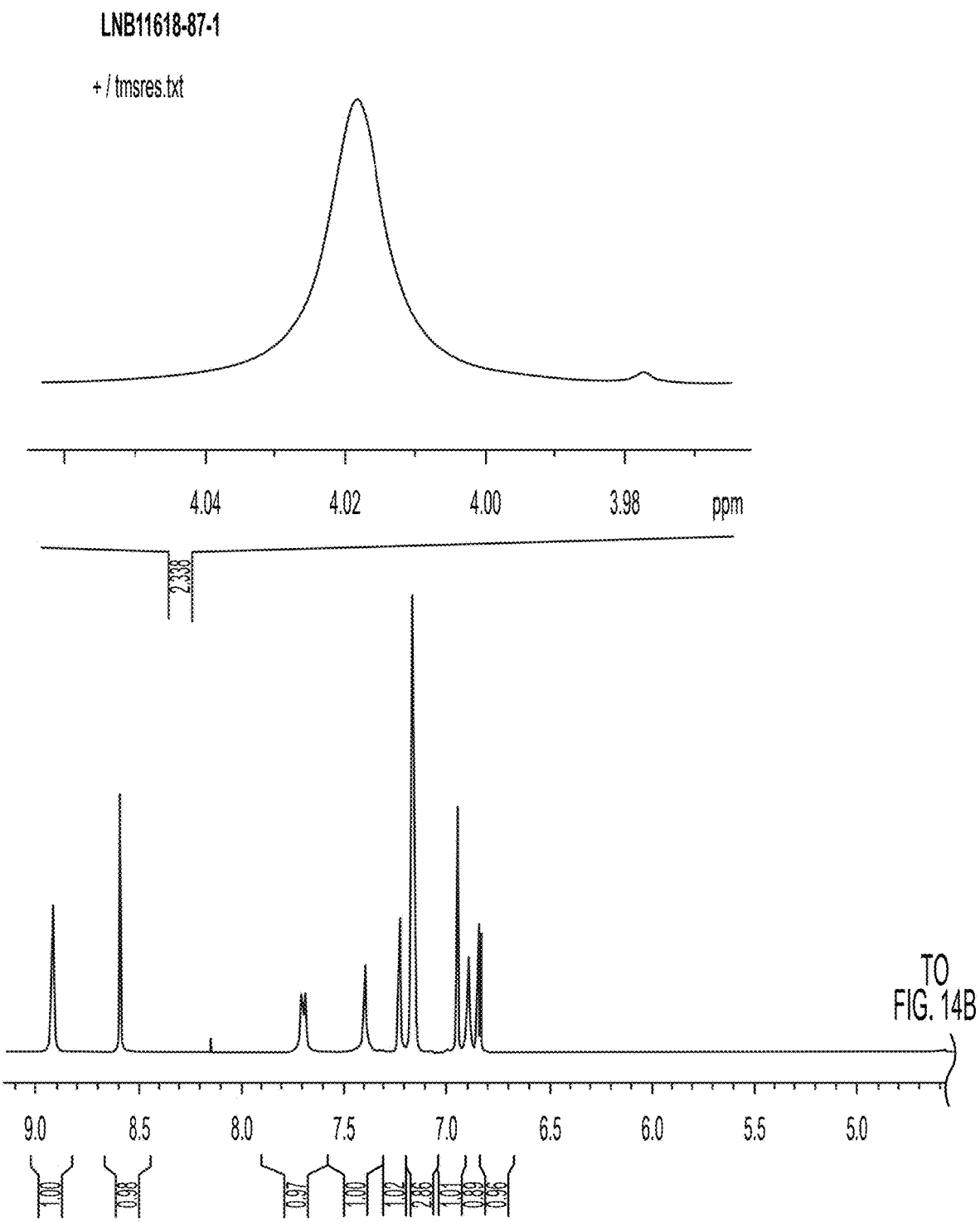
Figure 14B:
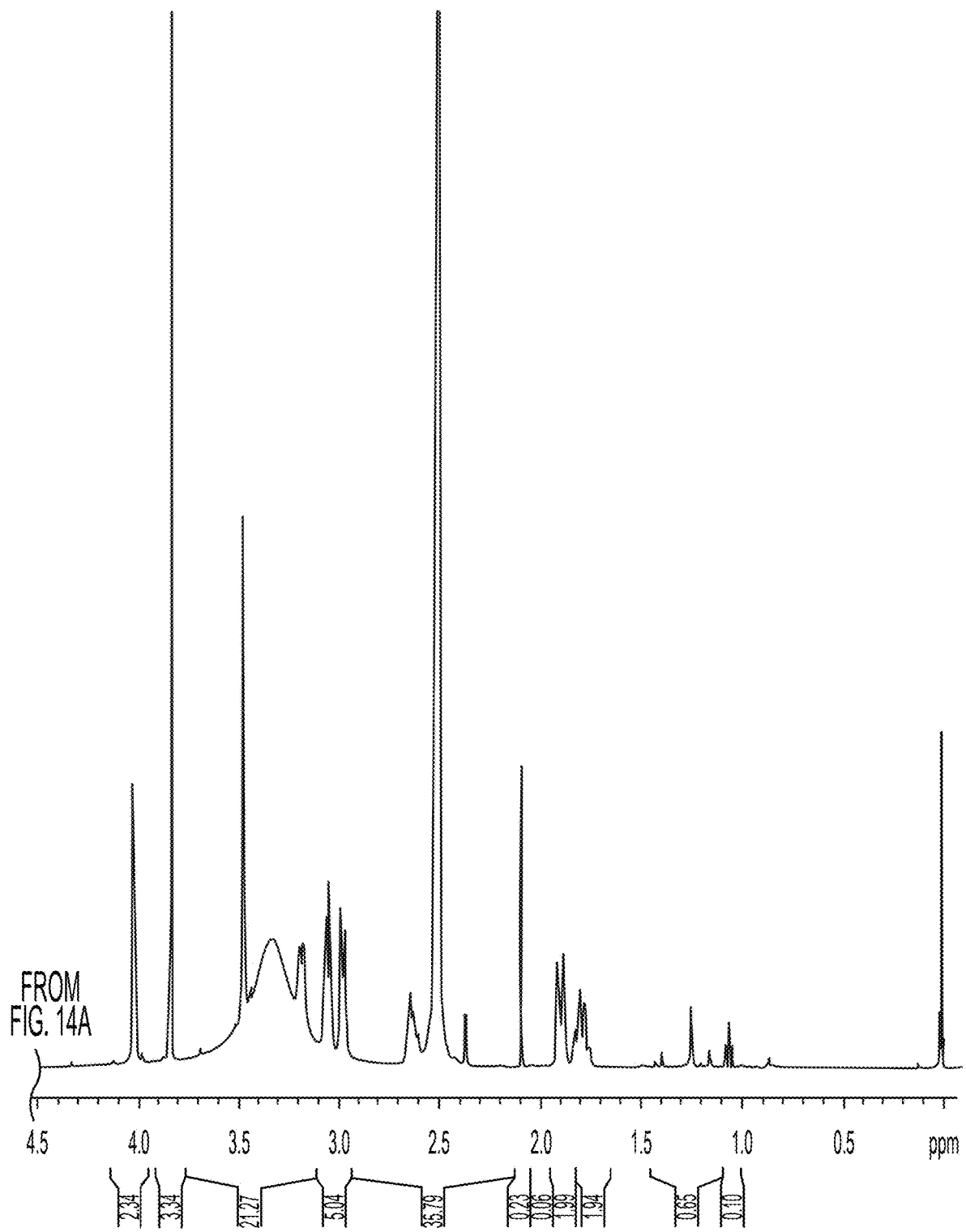
Figure 15:
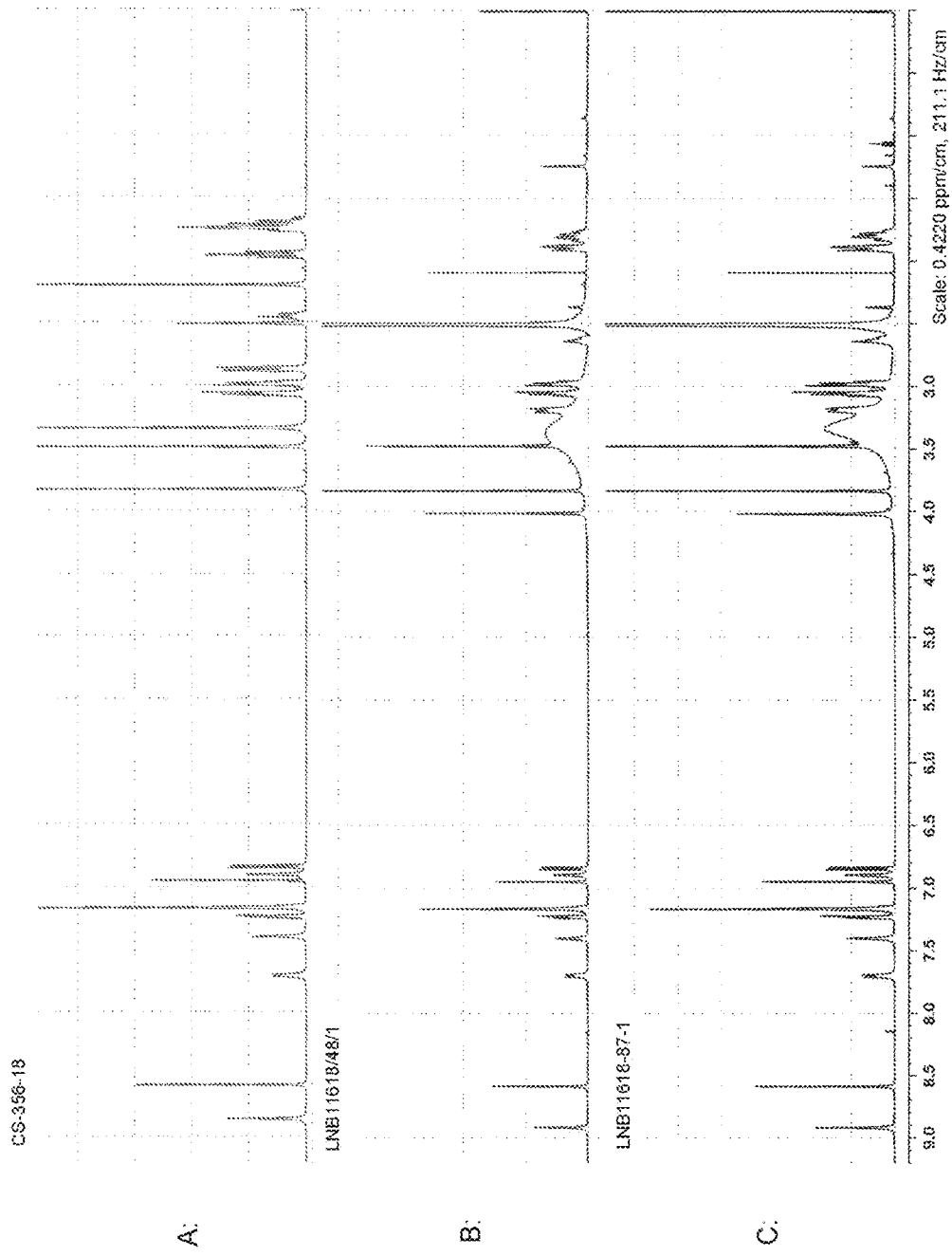
FIG. 15. Stacked 1H NMR Spectra of Formula I free base (A), Formula I L-tartrate Pattern 1 obtained from Method 1 (B) and L-tartrate Pattern 1 obtained from Method 2 (C)

The $^1$H NMR spectrum in FIG. 14A and FIG. 14B was consistent with a Formula I L-tartrate mono-salt and matched the $^1$H NMR spectra (FIG. 15) obtained for the solid obtained using method 1.

7 Day Stability Studies 7-day stability tests were carried out as follows:

Approximately 10-20 mg of Formula I L-tartrate Pattern 1 was placed at either 40° C./75% RH, 80° C. or under ambient light and temperature for 1 week. The resulting solids were analyzed by XRPD to assess the physical stability and HPLC to assess the chemical stability.

The results for the 7-day stability study are summarized below.

Results of 7-Day Stability Study on L-Tartrate Salt

| Input Material | Condition | XRPD | HPLC Purity (% Area) |
|---|---|---|---|
| L-Tartrate Pattern 1 Input HPLC Purity: 99.8% | Ambient temperature and light | Pattern 1 | 99.5 |
| | 40° C./75% RH | Pattern 1 | 99.6 |
| | 80° C. | Pattern 1 | 99.3 |

The 7-day Stability study indicated the following results:

The salt remained chemically stable under the stability conditions tested with no significant changes to the HPLC purity results.

There were also no significant changes to the XRPD patterns indicating that they were also physically stable.

Salt Disproportionation Studies

Salt disproportionation studies were carried out as follows:

Approximately 10-20 mg of Formula I free base, L-tartrate Pattern 1 were weighed into HPLC vials.

1 mL deionized water was then added to each vial and the vials capped and shaken at ambient temperature for 24 hours.

After this time, the samples were transferred to centrifuge tubes with nylon filters (0.22 µm) and centrifuged for approximately 15 minutes. The isolated solids were analyzed by XRPD and the filtrates analyzed by HPLC for concentration determination and the pH of all the filtrates were measured with a pH meter.

The results for salt disproportionation studies are summarized below.

Results of Salt Disproportionation Studies

| Input Material | Water pH Post-24 h | XRPD Result |
|---|---|---|
| Free Base | 5.63 | Free Base |
| L-Tartrate Pattern 1 | 3.43 | L-Tartrate Pattern 2 |

Salt disproportion studies indicated the following results:

No evidence of salt disproportionation was seen in any of the Formula I salts.

Figure 16:
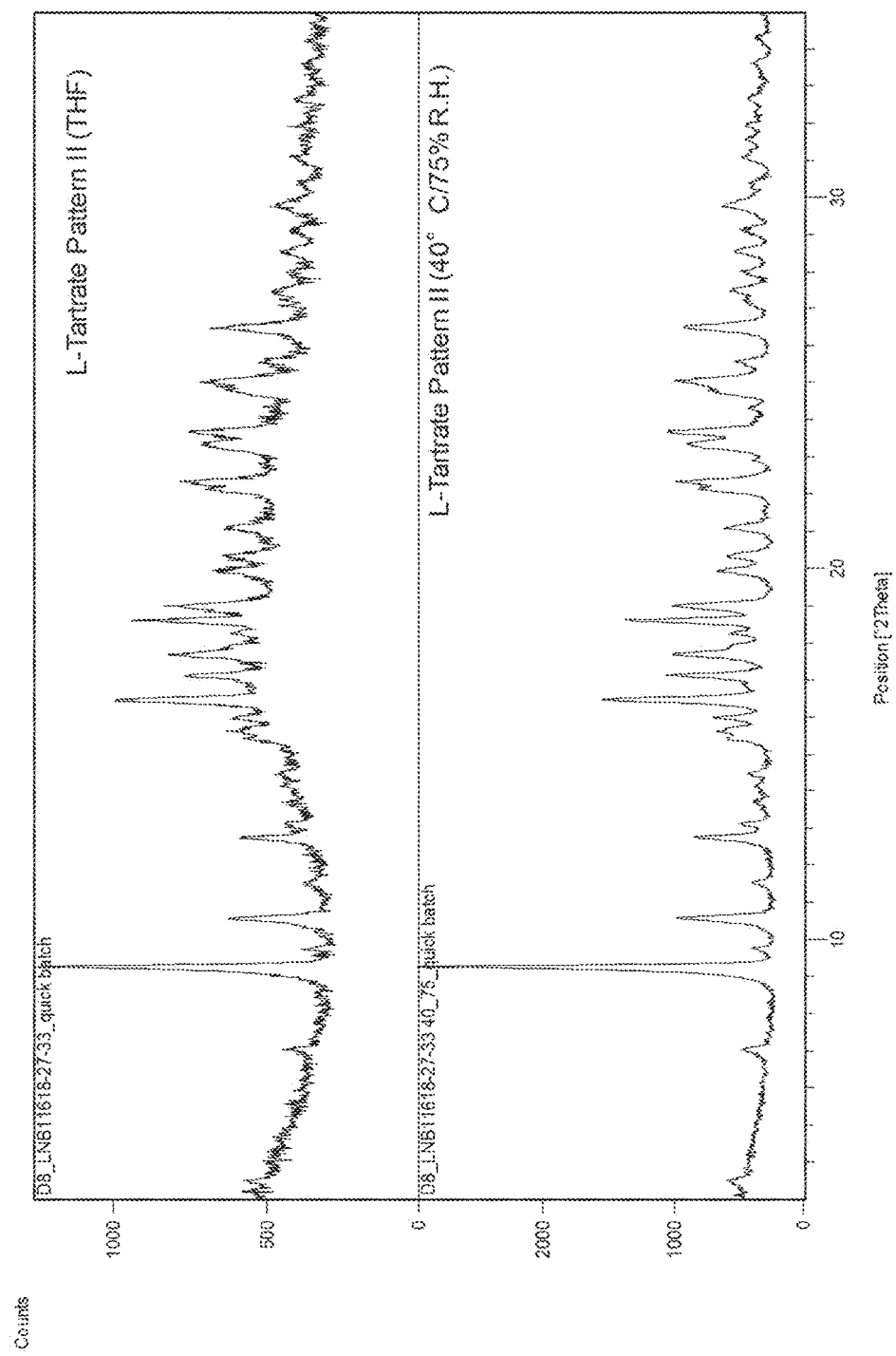
FIG. 16. XRPD Diffractogram of Formula I L-tartrate Pattern 2.

Formula I L-tartrate Pattern 1 converted to the L-tartrate Pattern 2 (FIG. 16) after slurrying, which was believed to be a hydrated salt, likely due to the uptake of water.

Hydration Studies

Hydration studies were carried out as follows:

Approximately 10-20 mg of Formula I free base, L-tartrate Pattern 1, were weighed into 1.5 mL vials.

Water/acetone mixtures were prepared to give water activities of 0.281, 0.637 and 0.888.

The appropriate water/acetone mixture was then added to each vial to form a slurry and the vials capped and shaken at ambient temperature for 24 hours.

After this time, the slurries were transferred to centrifuge tubes containing nylon filters (0.22 µm) and centrifuged for 15 minutes. The isolated solids were analyzed by XRPD.

The results for hydration studies are summarized below.

Results of Hydration Studies

| Input Material | Water Activity 0.281 XRPD Result | Water Activity 0.637 XRPD Result | Water activity 0.888 XRPD Result |
|---|---|---|---|
| L-Tartrate Pattern 1 | Pattern 1 | Pattern 1 | Pattern 2 (hydrate) |

Hydration studies indicated the following results:

The L-tartrate Pattern 1 material was observed to be stable up to a water activity of 0.888, at which this increased hydration level led to conversion to L-tartrate Pattern 2. Pattern 2 was believed to be a hydrated form.

Thermodynamic Solubility Studies

Thermodynamic Solubility Studies were carried out as follows:

Approximately 10 mg of Formula I free base Pattern 1 and L-tartrate Pattern 1, were weighed into a 1.5 mL screw-cap vial. The appropriate buffer system was added to create a slurry and the vials were shaken at ambient temperature (ca. 22° C.) for approximately 24 hours.

After this time, the slurries were transferred to centrifuge tubes containing nylon filters (0.22 µm) and filtered using a centrifuge for ca. 10 minutes. The isolated solids were then analyzed by XRPD and the filtrates measured by a pH meter and analyzed by HPLC for concentration.

The results for thermodynamic solubility studies are summarized below

Table of Results from Thermodynamic Studies

| Input | Media | pH Post-24 h Slurry | XRPD Result | HPLC Conc (mg/mL) |
|---|---|---|---|---|
| L-Tartrate Pattern 1 | water | 3.43 | Pattern 2 | 0.9 |
| | pH 1.0 | 1.87 | Possible HCl salt | 0.3 |
| | pH 4.5 | 3.99 | Pattern 2 | 0.3 |
| | pH 6.8 | 4.43 | Pattern 2 | 0.2 |
| Free Base | water | 5.63 | Free Base | <0.1 |
| | pH 1.0 | 1.37 | Possible HCl Salt | 0.3 |
| | pH 4.5 | 5.60 | Free Base | 11.9 |
| | pH 6.8 | 7.44 | Alternate crystalline form | <0.1 |

Thermodynamic solubility studies indicated the following results:

The XRPD results showed that at pH 6.8, Formula I free base showed a change in XRPD pattern likely to be salt formation in the case of the free base. This was not observed for the L-tartrate Pattern 1 salt.

A possible HCl salt was formed from the L-tartrate Pattern 1 and free base at pH 1.0 due to counterion switching, or salt formation in the case of Formula I free base.

The tartrate salt observed increased solubility in water (0.6 to 1.0 mg/mL) compared to Formula I free base (<0.1 mg/mL).

At pH 1.0, the L-tartrate Pattern 1 observed the same solubility (0.3 mg/mL) as Formula I free base.

At pH 4.5, Formula I free base was significantly more soluble (11.9 mg/mL) compared to the salts (0.2 to 2.8 mg/mL)

At pH 6.8, the L-tartrate showed slightly increased solubility (0.2 mg/mL) compared to the free base (<0.1 mg/mL)

Overall the L-tartrate Pattern 1 salt showed the consistently improved solubility in comparison to the Formula I free base, although at pH 4.5, Formula I free base was considerably more soluble.

SUMMARY

The preparation of Formula I L-tartrate Pattern 1 was successfully carried out on a 500 mg scale, with an isolated yield of 89% and a purity of 99.8%. Characterization by XRPD, TG/DTA and 1H NMR was undertaken and GVS analysis indicated that the material was slightly hygroscopic with mass uptake of 0.6 wt. % up to 90% RH. Post-GVS XRPD analysis showed no change in form after exposure to the humidity conditions. Under the accelerated stability conditions studied for one week (ambient temperature and light, 40° C./75% RH and 80° C.) the material was considered stable. Thermodynamic solubility studies showed that L-tartrate Pattern 1 had increased solubility compared to Formula I free base in water, pH 1.0 buffer and pH 6.8 buffer solutions. Salt disproportionation studies showed no evidence of disproportionation, although the material converted to the hydrated L-tartrate Pattern 2 material.

The preparation of Formula I L-tartrate Pattern 1 utilizing an ethanol stock solution of L-tartaric acid as opposed to a tetrahydrofuran stock solution was successfully carried out on a 100 mg scale. Characterization by XRPD and 1H NMR was consistent with the synthetic method. This indicated that the use of an ethanol stock solution does not adversely affect the production of this material.

Biological Studies

A. Study Objective

To compare the exposure of the compound of Formula I in male Sprague Dawley rats following oral administration of the free base and L-tartrate salt at a target dose of 20 mg/kg (as free base equivalent).

B. Brief Methods

The key experimental procedures are summarised in the table below. Further details of the in-life, formulation and bioanalytical procedures together with the data analysis, are described in Appendix 1.

Throughout this section, doses and concentrations are expressed as free base equivalents.

| TEST ARTICLE | Compound ID | Formula I | |
|---|---|---|---|
| | Batch | Batch 14 | LNB11618/48/1 |
| | Salt | Free base | L-Tartrate |
| | Salt formula weight | — | 677.68 |
| | Molecular weight | 527.59 | |
| STUDY DESIGN | Species | Male Sprague Dawley rats | |
| | Dose route | PO | |
| | Target Dose | 20 mg/kg | |
| | Dosing details | Via gavage needle; 3 mL/kg dose volume | |
| | Plasma collection | Pre-dose; Post-dose: 0.25, 0.5, 1, 2.5, 4, 5, 7, 10, 16, 24, 30 and 48 h | |
| FORMULATION | Vehicle | Milli-Q water | |
| | Appearance | Uniform fine milky white rapidly settling suspension with an apparent pH of 7.6 | Uniform milky white suspension with an apparent pH of 3.2 |
| | Target Concentration | 6.67 mg/mL | 6.67 mg/mL |

C. Results and Discussion

No adverse reactions or compound-related side effects were observed in any rats during the 48 h sampling period after oral administration of either free base or L-tartrate salt of Formula I.

Figure 17:
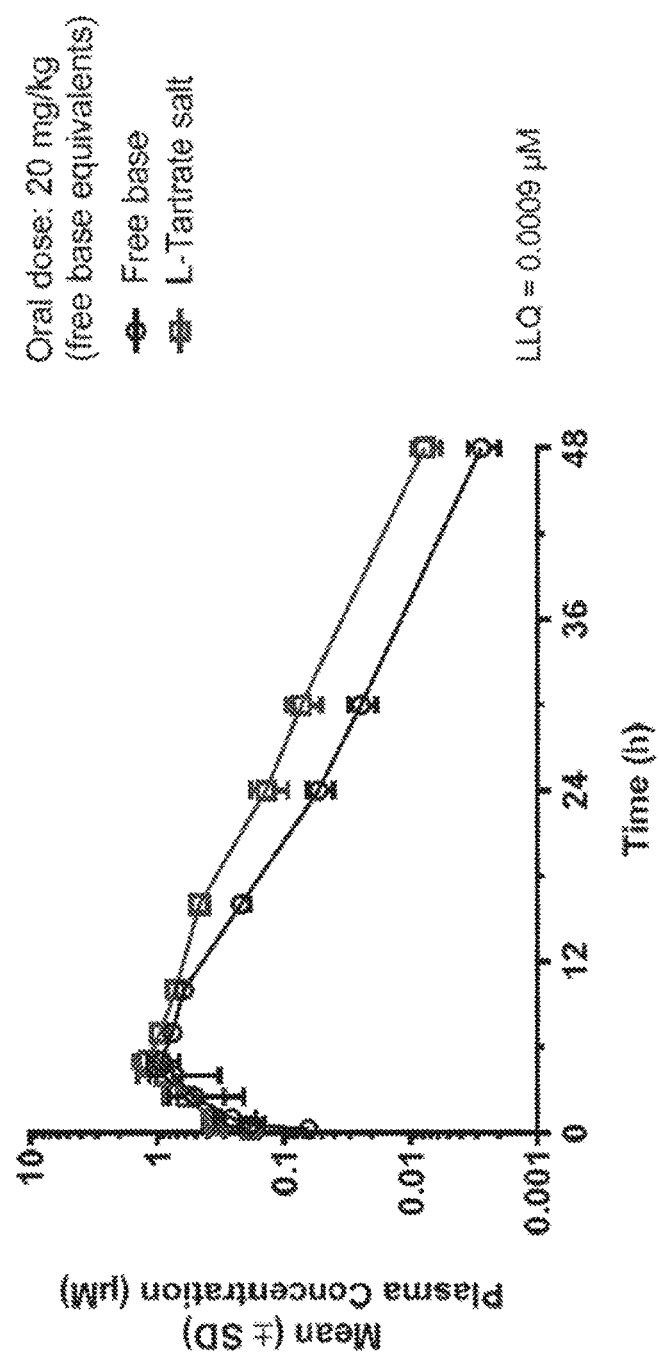
FIG. 17. Mean plasma concentrations of Formula I in male Sprague Dawley rats following oral administration of Formula I free base or L-tartrate salt at a dose of 20 mg/kg (free base equivalents).

The mean plasma concentration versus time profiles of Formula I following oral administration of free base or L-tartrate salt are shown in FIG. 17 and the mean exposure parameters are presented in Table 1.

Following oral administration of free base or L-tartrate salt of Formula I, maximum plasma concentrations of Formula I were observed at 5-7 h post-dose and the apparent oral half-life was consistent with that observed previously after IV dosing.

The exposure of Formula I was higher after dosing the L-tartrate salt. Cmax and AUC were approximately 30% and 50% greater respectively than the free base. The difference in AUC was statistically significant ($P<0.05$).

The known N-demethylation metabolite of Formula I (monitored using MRM parameters established previously) was detected in plasma and urine following oral administration both free base and L-tartrate salt, however concentrations could not be determined due to the lack of an authentic standard.

FIG. 17 shows mean plasma concentrations of Formula I in male Sprague Dawley rats following oral administration of Formula I free base or L-tartrate salt at a dose of 20 mg/kg (free base equivalents). Surprisingly, the Plasma AUC is significantly higher for the L-tartrate salt than for the free base.

TABLE 1

Mean plasma exposure parameters in male Sprague Dawley rats following oral administration of free base and L-tartrate salt of Formula I. All doses and concentrations are expressed as the free base equivalent. Data are shown as mean ± SD, n = 3.

| Parameter | Oral administration of Formula I | | IV administration |
| --- | --- | --- | --- |
| | Free base | L-Tartrate salt | Formula I [a] |
| Average Dose (mg/kg) | 20.0 | 20.1 | 4.48 |
| Apparent $t_{1/2}$ (h) | 5.6 ± 0.1 | 5.8 ± 0.2 | 4.8 |
| Plasma $AUC_{0-inf}$ (h*μM) | 9.93 ± 1.9 | 14.6 ± 1.5* | 4.57 |
| Plasma $C_{max}$ (μM) | 0.934 ± 0.26 | 1.20 ± 0.30 | — |
| $T_{max}$ (h) | 5.0 ± 0.0 | 5.7 ± 1 | — |
| BA (%) | 48.6 ± 9.2 | 71.3 ± 7.5* | — |
| % Dose in urine [b] | 0.208 ± 0.24 | 0.341 ± 0.042 | 1.14 |

[a] IV data are shown as mean of n = 2.
[b] Unchanged Formula I present in pooled urine (collected up to 48 h after oral administration, and up to 24 h after IV administration.
*Statistically significant differences (p < 0.05) between free base and L-tartrate salt

Appendix 1—Experimental Procedures and Data Analysis

Pharmacokinetics
Formulation Preparation

On the day of dosing, each formulation (i.e. free base or L-tartrate salt of Formula I) was prepared by wet-milling the solid compound (25.9 mg for free base and 34.3 mg for L-tartrate salt) in Milli-Q water (3.89 mL for free base Formula I and 4.00 mL for L-tartrate salt) using a mortar and pestle.

Each formulation was sonicated and thoroughly vortexed, producing uniform white suspensions (with apparent pH of 7.6 for the free base, and 3.2 for the L-tartrate salt), although the formulation for the free base was subject to rapid settling.

Based on the mass of compounds weighed and the volume of water used to prepare the two formulations, the nominal concentration of Formula I (as free base equivalent) in both was 6.67 mg/mL.

The dose administered to each rat was calculated on the basis of the rat weight (determined prior to dosing), the volume of formulation administered to each rat and the nominal concentration of test compound in the formulation.

In-Life

The exposure of Formula I was studied in overnight-fasted male Sprague Dawley rats that had access to water ad libitum throughout the pre- and post-dose sampling period, and access to food was re-instated 4 h post-dose. In-life details are provided in Table A1-1. Samples of arterial blood and total urine were collected up to 48 h post-dose. Arterial blood was collected directly into borosilicate vials (at 4° C.) containing heparin, Complete® (a protease inhibitor cocktail) and potassium fluoride to minimise potential for ex vivo degradation of Formula I in blood/plasma samples. Once collected, blood samples were centrifuged, supernatant plasma was removed and stored frozen (−80° C.) until analysis by LC-MS.

TABLE A1-1

In-life summary

| | | | | | | |
| --- | --- | --- | --- | --- | --- | --- |
| Species (strain) | Rat (Sprague Dawley) | | | | | |
| Sex (age) | Male (7-8 weeks) | | | | | |
| Test article | Formula I Free base | | | Formula I L-Tartrate salt | | |
| Nominal dose level | 20 mg/kg | | | 20 mg/kg | | |
| Dose route (dose volume) | Oral gavage (3 mL/kg) | | | Oral gavage (3 mL/kg) | | |
| Vehicle | Water (suspension, pH 7.6) | | | Water (suspension, pH 3.2) | | |
| Dose concentration* | 6.67 mg/mL | | | 6.67 mg/mL | | |
| Rat ID | A_4518 | B_4518 | C_4518 | D_4518 | E_4518 | F_4518 |
| Weight (g) | 276 | 281 | 265 | 287 | 255 | 275 |
| Dose volume (mL) | 0.83 | 0.84 | 0.80 | 0.86 | 0.77 | 0.83 |
| Calculated dose* (mg/kg) | 20.1 | 19.9 | 20.1 | 20.0 | 20.1 | 20.1 |

*Based on the nominal concentration of Formula I in the formulation (free base equivalents)

Bioanalysis
Sample Processing and Analysis

The extraction of the test compound from plasma samples was conducted using protein precipitation with acetonitrile. Both solution and plasma standards were freshly prepared, with each set of standards comprising at least seven different analyte concentrations. Solution standards were diluted from a stock solution (1 mg/mL in DMSO) with 50% acetonitrile in water. Plasma standards were prepared by spiking blank plasma (50 μL) with solution standards (10 μL) and the internal standard, diazepam (10 μL, 5 μg/mL).

Plasma samples were similarly prepared, except that blank acetonitrile (10 μL) was added instead of solution standards. Protein precipitation was carried out by the addition of acetonitrile (120 μL), vortexing (20 s) and centrifugation (10,000 rpm) in a microcentrifuge for 3 minutes. The supernatant was subsequently separated and 3 μL injected directly onto the column for LC/MS analysis using conditions tabulated below. All plasma concentrations are expressed as the non-salt equivalent. A summary of the bioanalytical method is provided in Table A1-2.

TABLE A1-2

Summary of the bioanalytical method Instrument

| | |
|---|---|
| Instrument | Waters Xevo TQ coupled to a Waters Acquity UPLC |
| Detection | Positive electrospray ionisation multiple-reaction monitoring mode |
| Column | Supelco Ascentis Express RP C8 column (50 × 2.1 mm, 2.7 μm) |
| LC conditions | Gradient cycle time: 4 min; Injection vol: 3 μL; Flow rate: 0.4 mL/min |
| Mobile phase | Acetonitrile-water gradient with 0.05% Formic acid |
| Extraction (plasma) | Protein precipitation using acetonitrile (2-fold volume ratio) |
| Extraction (urine) | Urine treated with acetonitrile and further diluted with 50% acetonitrile-water (total dilution 20 & 200-fold) |

| Analyte | $t_R$ (min) | Transition (m/z) | Cone voltage (V) | CID (V) |
|---|---|---|---|---|
| Formula I | 1.6 | 528.32 > 98.14 | 55 | 35 |
| N-demethylation metabolite * | 1.6 | 514.30 > 84.10 | 55 | 35 |
| Diazepam (internal standard) | 2.14 | 285.17 > 154.08 | 40 | 25 |

* The known N-demethylation metabolite was monitored throughout the analysis using MRM parameter established.

Assay Validation

The calibration range used was based on the typical concentration range observed for pharmacokinetic studies conducted in laboratory animals.

The assay was assessed with respect to calibration range, linearity, accuracy, precision and extraction efficiency. Quantification was performed using an internal standard method employing the system software, Quanlynx. Assay validation was conducted only on a single analytical run; inter-day validation has not been performed. The lower limit of detection (LLD) was not determined. Storage stability was not assessed.

The extraction efficiency was acceptable at relevant concentrations (50 or 100 and 500 ng/mL) and the assay was found to exhibit satisfactory linearity, accuracy and precision within the concentration range of 0.5 to 10,000 ng/mL. A summary of the validation is provided in Table A1-3.

TABLE A1-3

Summary of assay validation

| Matrix^ | QC (ng/mL) | QC Data | | Calibration Data | | |
|---|---|---|---|---|---|---|
| | | Accuracy (% bias)* | Precision (% RSD) | Range (ng/mL) | $R^2$ | LLQ # (ng/mL) |
| Plasma | 50 (n = 7) | −0.3 | 4.8 | 0.5-10,000 | 0.9999 | 0.5 |
| | 500 (n = 7) | 0.1 | 0.6 | | | |
| Urine | 500 (n = 3) | 0.0 | 1.6 | 2.5-5,000 | 0.9999 | 2.5 |

*Acceptance criteria for batch analysis: at least 67% of the QC samples lie within ±15% of nominal values (FDA Guidance for Industry: Bioanalytical Method Validation, May 2001).
Lower limit of quantitation (LLQ) is defined by the lowest acceptable calibration standard for which the back calculated concentration lies within ±20% of the nominal concentration.
^Blank plasma (for the analysis of plasma samples) and 50% acetonitrile/water (for the analysis of urine sample) was used for preparation of the calibration standards and QC samples. Data were fitted to a linear or quadratic equation as appropriate. The free base compound was used to prepare the standard curve for the analysis and plasma standard of the L-tartrate salt was also prepared at 500 ng/mL (free base equivalent) for compound content comparison. Less than 10% difference in response was observed, therefore no correction was required between the analyses of free base and L-tartrate salt of Formula I.

Standard Calculations

Plasma concentration versus time data were analysed using non-compartmental methods (PKSolver Version 2.0). Standard calculations for each pharmacokinetic parameter are listed below.

$$t_{1/2} = \frac{Ln(2)}{\lambda_z} \quad BA = \frac{AUC_{oral} \times Dose_{IV}}{AUC_{IV} \times Dose_{oral}} \times 100\%$$

$AUC_{IV}$ Area under the plasma concentration versus time profile from time zero to infinity after IV administration (reported previously: CDCO_FAK_11_031)

$t_{1/2}$ Elimination half-life $\lambda_z$ Terminal elimination rate constant after IV administration BA Oral bioavailability $AUC_{oral}$ Area under the plasma concentration versus time profile from time zero to infinity after oral administration $C_{max}$ Maximum plasma concentration observed after oral administration.

$T_{max}$ Time to achieve $C_{max}$

Differences in pharmacokinetic parameters (t½, AUC, Cmax, Tmax and BA) between free base and L-tartrate salt were evaluated using an unpaired t-test testing for significance at α=0.05 (GraphPad Prism, version 7.01)

The invention claimed is:

1. A crystalline form of a L-tartrate salt of a compound of formula I:

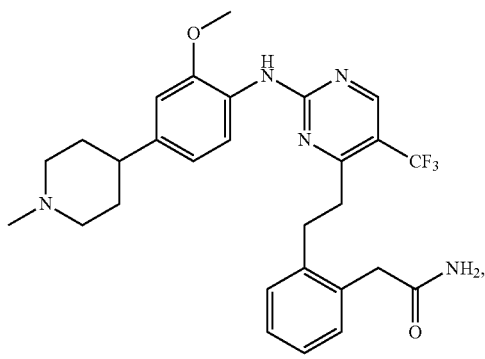

Formula I wherein the crystalline form has a characteristic powder diffraction pattern (XRPD) using Cu K radiation with major peaks at 2 theta values at about 9.1, 15.5, 17.0, 18.5, 21.8, 22.1, and 25.3.

2. The crystalline form of claim 1, wherein the crystalline form has a solubility in water of between 0.8 mg/ml and 1.0 mg/ml.

3. The crystalline form of claim 1, wherein the crystalline form has a solubility in water of 0.9 mg/ml.

4. The crystalline form of claim 1, wherein the crystalline form has a melt onset of approximately between 172° Celsius to 174° Celsius.

5. The crystalline form of claim 1, wherein the crystalline form has a melt onset of approximately 173° Celsius.

6. The crystalline form of claim 1, wherein the crystalline form has crystallinity of 80% or greater.

7. A method of treating a proliferative disease using the crystalline form of claim 1.

8. A pharmaceutical composition comprising the crystalline form of claim 1.

9. The pharmaceutical composition of claim 8 wherein said composition is suitable for oral administration.

* * * * *